(12) United States Patent
Sebire et al.

(10) Patent No.: US 12,177,012 B2
(45) Date of Patent: Dec. 24, 2024

(54) FORWARD ERROR CORRECTION AND RAN RETRANSMISSION

(71) Applicant: Nokia Technologies Oy, Espoo (FI)

(72) Inventors: Benoist Pierre Sebire, Tokyo (JP); Esa Mikael Malkamaki, Espoo (FI); David Navratil, Helsinki (FI)

(*) Notice: Subject to any disclaimer, the term of this patent is extended or adjusted under 35 U.S.C. 154(b) by 0 days.

(21) Appl. No.: 17/211,085

(22) Filed: Mar. 24, 2021

(65) Prior Publication Data

US 2022/0311539 A1    Sep. 29, 2022

(51) Int. Cl.
*H04L 1/00*    (2006.01)
*H04L 1/18*    (2023.01)

(52) U.S. Cl.
CPC .......... *H04L 1/0041* (2013.01); *H04L 1/0017* (2013.01); *H04L 1/0061* (2013.01); *H04L 1/18* (2013.01)

(58) Field of Classification Search
None
See application file for complete search history.

(56) References Cited

U.S. PATENT DOCUMENTS

| | | | |
|---|---|---|---|
| 10,554,331 B2 | 2/2020 | Navratil et al. | |
| 11,445,570 B1* | 9/2022 | Krannawitter | H04W 4/80 |
| 11,831,579 B2* | 11/2023 | Rajagopal | H04W 72/23 |
| 2007/0049314 A1* | 3/2007 | Balachandran | H04W 52/50 |
| | | | 455/518 |
| 2010/0223523 A1* | 9/2010 | Dinan | H04L 1/0009 |
| | | | 714/751 |
| 2011/0107172 A1* | 5/2011 | Chapman | H04N 21/236 |
| | | | 714/752 |
| 2014/0044028 A1* | 2/2014 | Nammi | H04L 1/1825 |
| | | | 370/336 |
| 2015/0319464 A1* | 11/2015 | Hellge | H04N 19/89 |
| | | | 375/240.27 |
| 2016/0007240 A1* | 1/2016 | Belghoul | H04W 48/16 |
| | | | 370/331 |

(Continued)

FOREIGN PATENT DOCUMENTS

| | | |
|---|---|---|
| WO | WO-2014/161804 A1 | 10/2014 |
| WO | WO-2017/182704 A1 | 10/2017 |
| WO | WO-2020/101639 A1 | 5/2020 |

OTHER PUBLICATIONS

RP-201038 "WID Revision: NR Multicast and Broadcast Services" 3GPP TSG RAN Meeting #88-e. E-Meeting, Jun. 29-Jul. 3, 2020.
(Continued)

*Primary Examiner* — Mujtaba M Chaudry
(74) *Attorney, Agent, or Firm* — Harrington & Smith

(57) ABSTRACT

For a source stream of input data where FEC scheme(s) have been used to create a repair stream, transmitting by a network node packet(s) comprising data of the source stream or the repair stream packaged as at least part of PDU(s). An ARQ or HARQ process is applied to the PDU(s). The network node receives feedback information as part of the process corresponding to the PDU(s), including positive ACK/NACK response for the PDUs. The retransmissions of the negatively acknowledged PDU(s) are controlled when the FEC scheme is known not to be able to compensate for loss(e)s of packet(s) contained in the PDU(s) indicated as being negatively acknowledged. A UE receives packet(s), determines loss(es), and, in response to a determination the FEC scheme is known to be able to recover from the loss(es), sends at least one ACK for any lost packets that correspond to the one or more loss(es).

20 Claims, 9 Drawing Sheets

(56) References Cited

U.S. PATENT DOCUMENTS

| | | | |
|---|---|---|---|
| 2017/0187491 A1* | 6/2017 | Jang | H03M 13/116 |
| 2017/0264316 A1* | 9/2017 | Lee | H03M 13/1128 |
| 2018/0183465 A1* | 6/2018 | Vivier | H03M 13/353 |
| 2018/0249456 A1* | 8/2018 | Liu | H04W 72/0413 |
| 2019/0357295 A1* | 11/2019 | Kim | H04W 68/005 |
| 2020/0145092 A1* | 5/2020 | Jung | H04B 7/0888 |
| 2020/0252080 A1* | 8/2020 | Lam | H03M 13/112 |
| 2021/0289391 A1* | 9/2021 | Paladugu | H04L 47/24 |

OTHER PUBLICATIONS

3GPP TR 23.757 V1.2.0 $3^{rd}$ Generation Partnership Project; Technical Specification Group Services and System Aspects; Study on Architectural Enhancements for 5G Multicast-Broadcast Services (Release 17) Nov. 2020.

Luby et al. "RaptorQ Forward Error Correction Scheme for Object Delivery" Internet Engineering Task Force (IETF) RFC-6330. Aug. 2011.

Luby et al. "Raptor Forward Error Correction Scheme for Object Delivery" Network Working Group RFC-5053. Oct. 2007.

3GPP TS 38.331 V15.3.0 $3^{rd}$ Generation Partnership Project; Technical Specification Group Radio Access Network; NR; Radio Resource Control (RRC) protocol specification (Release 15). Sep. 2018.

3GPP TS 38.322 V15.3.0 $3^{rd}$ Generation Partnership Project; Technical Specification Group Radio Access Network; NR; Radio Link Control (RLC) Protocol Specification (Release 15) Sep. 2018.

ETSI TS 138 300 V16.2.0 5G; NR; NR and NG-RAN Overall Description; Stage-2 (3GPP TS 38.300 version 16.2.0 Release 16) Jul. 2020.

* cited by examiner

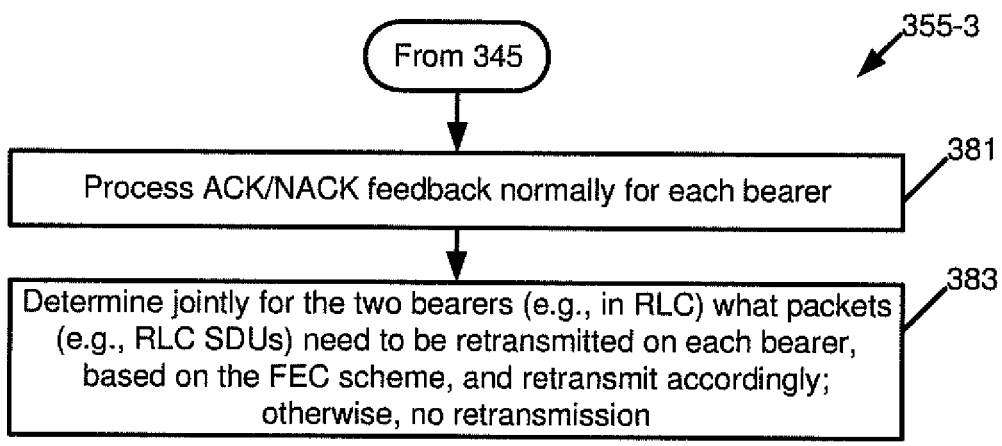
FIG. 3C
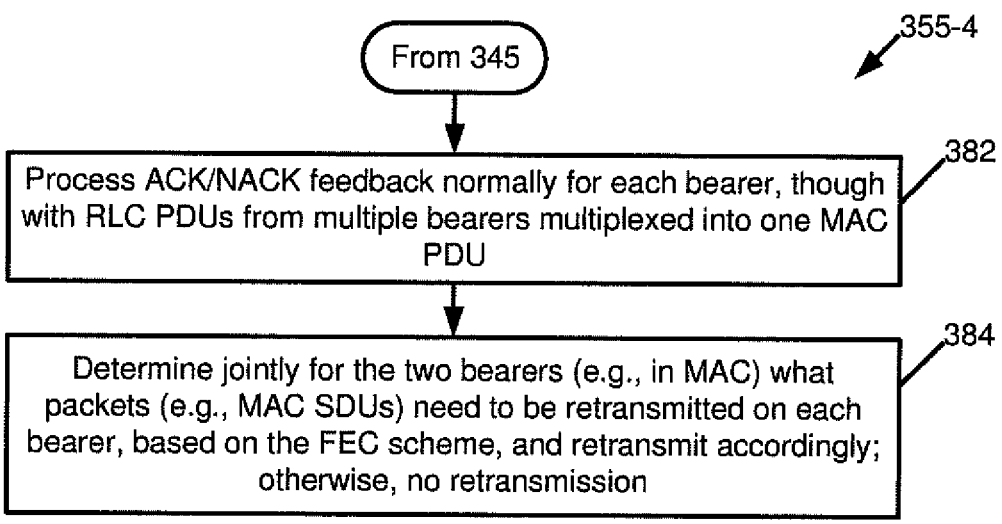
FIG. 3D
FIG. 3E

FORWARD ERROR CORRECTION AND RAN RETRANSMISSION

TECHNICAL FIELD

Exemplary embodiments herein relate generally to wireless communications and, more specifically, relate to error correction and retransmission within wireless communications.

BACKGROUND

In wireless communication systems, such as cellular communication systems, the wireless channel can cause errors in the data that has been transmitted. That is, the data that are received after traversing the wireless channel may have errors.

There are a number of techniques to address the possibility of errors. For instance, if the receiving device, such as a User Equipment (UE), determines there are errors in the data, the receiving device can use techniques such as Automatic Repeat request (ARQ) and/or Hybrid ARQ (HARQ), which are schemes where the receiving device requests retransmission of packets that are detected to have error(s) or to have been lost.

ARQ and HARQ are low-level protocols, meaning these are performed in layer(s) of a protocol stack nearer to the physical layer, which performs the transmission and reception of data. Meanwhile, Forward Error Correction (FEC) is applied at higher layer(s), further away from the physical layer and closer to the application layer.

As to FEC, FEC at higher layers protects against losses and typically allows a given number of packets to be lost. FEC is applied to the data before transmission, and requires some overhead, i.e., additional bits that are sent along with the data and that can provide indication of errors and enable error correction. The application of these error correction bits is commonly referred to as error correction coding, as the FEC coding technique allows certain combinations of extra bits and data to be determined to be known errors. Those combinations can be used to correct the errors.

FEC can be applied in a block-wise manner, meaning that the coding is applied in blocks of codes and corresponding blocks of data. The stronger the coding, the stronger the protection and the larger the number of packets which can be lost, but also the larger number of information that has to be added for the FEC scheme.

Another technique used to increase reliability is to send multiple copies of the data, e.g., using multiple streams and corresponding paths. Consider a simple duplication scheme as FEC. In this case, only one packet can be lost, either the original, or the duplicate. If both packets are lost, the original content cannot be recovered.

BRIEF SUMMARY

This section is intended to include examples and is not intended to be limiting.

In an exemplary embodiment, a method is disclosed that includes, by a network node in a wireless network, for a source stream of input data where one or more forward error correction schemes have been used to create a repair stream corresponding to the source stream, transmitting by the network node one or more packets comprising data of the source stream or the corresponding repair stream packaged as at least part of one or more protocol data units. The method includes applying an automatic repeat request or hybrid automatic repeat request process to the one or more protocol data units. The method also includes receiving by the network node feedback information as part of the process corresponding to the one or more protocol data units, the feedback information comprising positive acknowledgement/negative acknowledgement response for the one or more protocol data units. The method further includes controlling retransmissions of the one or more negatively acknowledged protocol data units when the forward error correction scheme is known not to be able to compensate for losses of one or more of the packets contained in the one or more protocol data units indicated as being negatively acknowledged by the feedback information.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to: by a network node in a wireless network, for a source stream of input data where one or more forward error correction schemes have been used to create a repair stream corresponding to the source stream, transmit by the network node one or more packets comprising data of the source stream or the corresponding repair stream packaged as at least part of one or more protocol data units; apply an automatic repeat request or hybrid automatic repeat request process to the one or more protocol data units; receive by the network node feedback information as part of the process corresponding to the one or more protocol data units, the feedback information comprising positive acknowledgement/negative acknowledgement response for the one or more protocol data units; and control retransmissions of the one or more negatively acknowledged protocol data units when the forward error correction scheme is known not to be able to compensate for losses of one or more of the packets contained in the one or more protocol data units indicated as being negatively acknowledged by the feedback information.

An exemplary computer program product includes a computer-readable storage medium bearing computer program code embodied therein for use with a computer. The computer program code includes: code, by a network node in a wireless network, for a source stream of input data where one or more forward error correction schemes have been used to create a repair stream corresponding to the source stream, for transmitting by the network node one or more packets comprising data of the source stream or the corresponding repair stream packaged as at least part of one or more protocol data units; code for applying an automatic repeat request or hybrid automatic repeat request process to the one or more protocol data units; code for receiving by the network node feedback information as part of the process corresponding to the one or more protocol data units, the feedback information comprising positive acknowledgement/negative acknowledgement response for the one or more protocol data units; and code for controlling retransmissions of the one or more negatively acknowledged protocol data units when the forward error correction scheme is known not to be able to compensate for losses of one or more of the packets contained in the one or more protocol data units indicated as being negatively acknowledged by the feedback information.

In another exemplary embodiment, an apparatus comprises means for performing: by a network node in a wireless network, for a source stream of input data where one or more forward error correction schemes have been used to create a repair stream corresponding to the source stream, transmitting by the network node one or more packets comprising data of the source stream or the corresponding repair stream packaged as at least part of one or more protocol data units; applying an automatic repeat request or hybrid automatic repeat request process to the one or more protocol data units; receiving by the network node feedback information as part of the process corresponding to the one or more protocol data units, the feedback information comprising positive acknowledgement/negative acknowledgement response for the one or more protocol data units; and controlling retransmissions of the one or more negatively acknowledged protocol data units when the forward error correction scheme is known not to be able to compensate for losses of one or more of the packets contained in the one or more protocol data units indicated as being negatively acknowledged by the feedback information.

In an exemplary embodiment, a method is disclosed that includes, by a user equipment in a wireless network, for a source stream of data where one or more forward error correction schemes have been used to create a repair stream corresponding to the source stream, receiving by the user equipment one or more packets comprising data of the source stream or the corresponding repair stream. The method includes determining, by the user equipment, one or more losses corresponding to the one or more received packets for the received source stream and the corresponding repair stream. The method further includes determining by the user equipment whether the forward error correction scheme is known to be able to recover from the losses. The method additionally includes, in response to a determination the forward error correction scheme is known to be able to recover from the losses, sending by the user equipment at least one acknowledgement for any lost packets that correspond to the one or more losses.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to: by a user equipment in a wireless network, for a source stream of data where one or more forward error correction schemes have been used to create a repair stream corresponding to the source stream, receive by the user equipment one or more packets comprising data of the source stream or the corresponding repair stream; determine, by the user equipment, one or more losses corresponding to the one or more received packets for the received source stream and the corresponding repair stream; determine by the user equipment whether the forward error correction scheme is known to be able to recover from the losses; and in response to a determination the forward error correction scheme is known to be able to recover from the losses, send by the user equipment at least one acknowledgement for any lost packets that correspond to the one or more losses.

An exemplary computer program product includes a computer-readable storage medium bearing computer program code embodied therein for use with a computer. The computer program code includes: code, by a user equipment in a wireless network, for a source stream of data where one or more forward error correction schemes have been used to create a repair stream corresponding to the source stream, for receiving by the user equipment one or more packets comprising data of the source stream or the corresponding repair stream; code for determining, by the user equipment, one or more losses corresponding to the one or more received packets for the received source stream and the corresponding repair stream; code for determining by the user equipment whether the forward error correction scheme is known to be able to recover from the losses; and code for in response to a determination the forward error correction scheme is known to be able to recover from the losses, sending by the user equipment at least one acknowledgement for any lost packets that correspond to the one or more losses.

In another exemplary embodiment, an apparatus comprises means for performing: by a user equipment in a wireless network, for a source stream of data where one or more forward error correction schemes have been used to create a repair stream corresponding to the source stream, receiving by the user equipment one or more packets comprising data of the source stream or the corresponding repair stream; determining, by the user equipment, one or more losses corresponding to the one or more received packets for the received source stream and the corresponding repair stream; determining by the user equipment whether the forward error correction scheme is known to be able to recover from the losses; and in response to a determination the forward error correction scheme is known to be able to recover from the losses, sending by the user equipment at least one acknowledgement for any lost packets that correspond to the one or more losses.

BRIEF DESCRIPTION OF THE DRAWINGS

In the attached Drawing Figures:

FIGS. 3A, 3B, 3D, and 3E are alternative or additional options for performing block 355 of FIG. 3, in accordance with exemplary embodiments;

FIG. 3C illustrates a special case where each packet is contained within a single PDU (RLC or PDCP) and that the repair packets corresponding to the same source packet use the same SN as the PDU carrying that source packet;

DETAILED DESCRIPTION OF THE DRAWINGS

Figure 1:
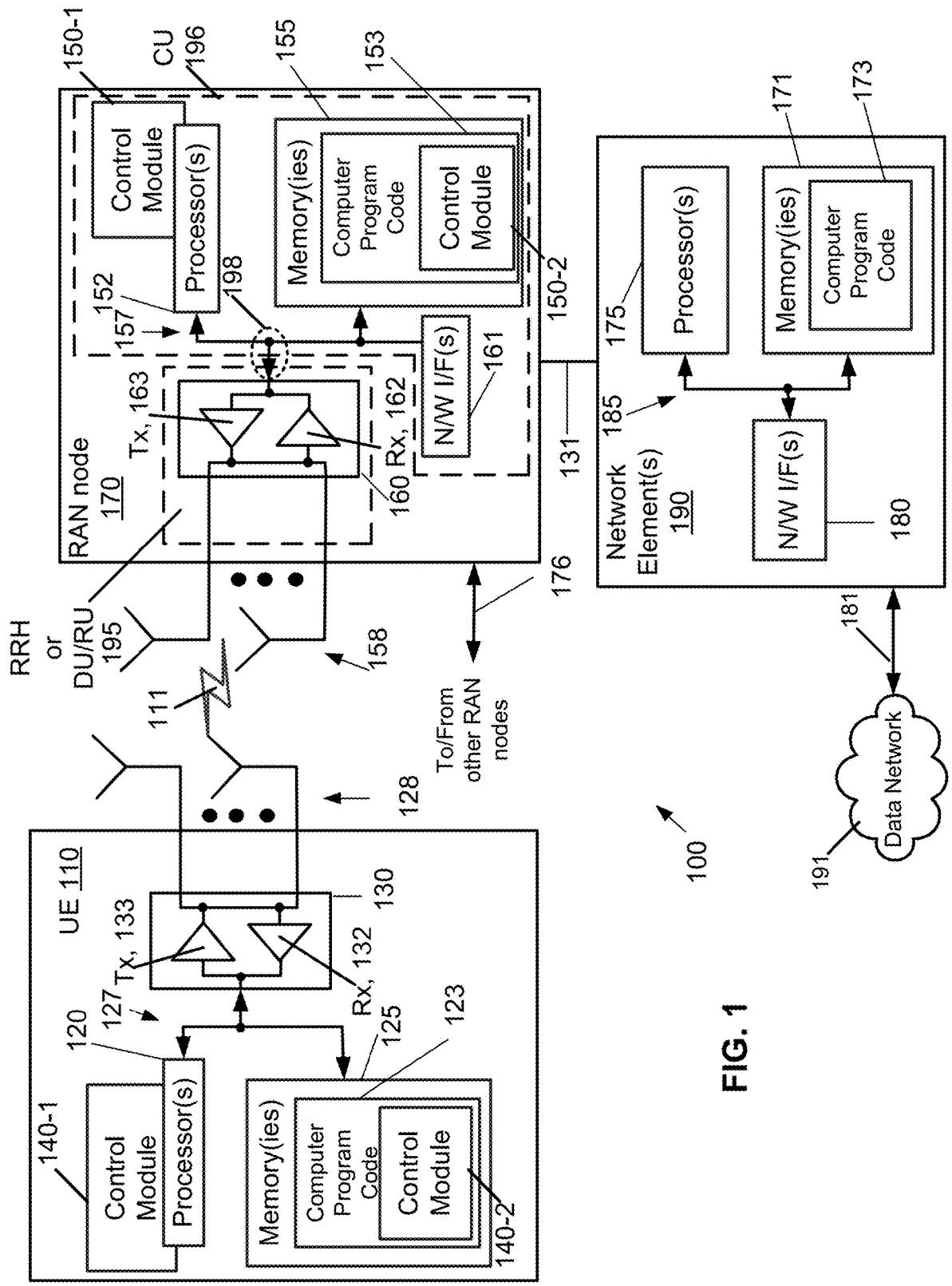
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for forward error correction and RAN retransmissions. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell or more cells is supported by one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein.

Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360-degree area so that the single base station's coverage area covers an approximate oval or circle. Furthermore, each cell can correspond to a single carrier and a base station may use multiple carriers. So, if there are three 120-degree cells per carrier and two carriers, then the base station has a total of 6 cells.

The wireless network 100 may include a network element or elements 190 that may include core network functionality, and which provides connectivity via a link or links 181 with a data network 191, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor-based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, vehicles with a modem device for wireless V2X (vehicle-to-everything) communication, image capture devices such as digital cameras having wireless communication capabilities, gaming devices having wireless communication capabilities, music storage and playback appliances having wireless communication capabilities, Internet appliances (including Internet of Things, IoT, devices) permitting wireless Internet access and possibly browsing, IoT devices with sensors and/or actuators for automation applications with wireless communication tablets with wireless communication capabilities, as well as portable units or terminals that incorporate combinations of such functions.

Having thus introduced one suitable but non-limiting technical context for the practice of the exemplary embodiments, an overview of an exemplary technical area where the exemplary embodiments might be used is described, then the exemplary embodiments will be described with greater specificity.

In relation to the technical area, IETF defines a FEC framework in RFC 6363 where one or more application data units (ADUs) are combined into a source block (which may be divided into several source packets for transport) and an FEC scheme provides one or several repair symbols which can be transported in one or several repair packets. Application-layer FEC is also possible, but in this case, the distinction between source blocks and repair blocks, if any, is not known unless an application provides such information to the 5G system explicitly. This may be provided via an NEF allowing the 5G system to identify QoS flows for source and repair blocks. See WO2020101639A1.

3GPP is currently working on introducing MBS in NR with one objective being to "specify required changes to improve reliability of Broadcast/Multicast service." See RP-201038, 3GPP TSG RAN Meeting #88-e, E-meeting, Jun. 29-Jul. 3, 2020 (revision of RP-193248).

In 3GPP TR 23.757 (see 3GPP TR 23.757 V1.2.0 (2020-11)), SA2 describes data transmission as follows:

1) Initially, the content is transmitted from the content provider to the MBSU.

2) The MBSU processes the received data (e.g., applies FEC, raptor codes, and the like).

3) The MBSU forwards the multicast data (i.e., the processed data) to the MB-UPF.

4) The MB-UPF sends the forwarded data using the associated tunnel to the NG-RAN nodes.

5) The NG-RAN node transmits the data over the air using over-the-air PTM bearers, which is received by the UE.

For FEC, TR 23.757 also states that "two outgoing streams are created for one incoming stream: a main stream and a repair stream. If several content streams are received, they will be transmitted as several outgoing streams . . . ".

For reliable transmission of MBS service, RAN2 is considering a combination of PTM and PTP transmission where the PTP path would address the possible losses of the PTM path.

One issue that remains is, when an FEC is used (here for MBS), not all PDCP SDUs have to be successfully transmitted and losses should be allowed. This is currently not possible since an RB—here carrying an MBS service—will either be configured to tolerate no losses (with RLC AM) or to allow any (with RLC UM). As a result, there is no possibility to benefit from FEC when RLC AM is used. This is especially problematic for PTM transmissions, where having all retransmissions individually handled via PTP might potentially reduce the attractiveness of PTM for reliable delivery. By relying on an FEC to recover from errors on the PTM path, the need for individual retransmissions via RLC AM on the PTP path would decrease, thereby making PTM more attractive.

The exemplary embodiments address these and other issues. In short, it is proposed herein, in exemplary embodiments, to control retransmissions in the RAN in such a way that only when the FEC is known not to be able to compensate for losses, will retransmissions take place (that is, be performed). Retransmissions can either be HARQ retransmissions or ARQ retransmissions, for instance.

Multiple scenarios are addressed below. A first scenario assumes that only one PDCP entity and one radio bearer is used. In a second scenario, it is assumed that source and repair streams are delivered to the RAN node 170 via individual QoS flows, and the QoS flows are mapped to individual bearers (e.g., individual PDCP entities). In a third scenario, there could be a single repair stream for multiple source streams. These three scenarios are described below.

Figure 2:
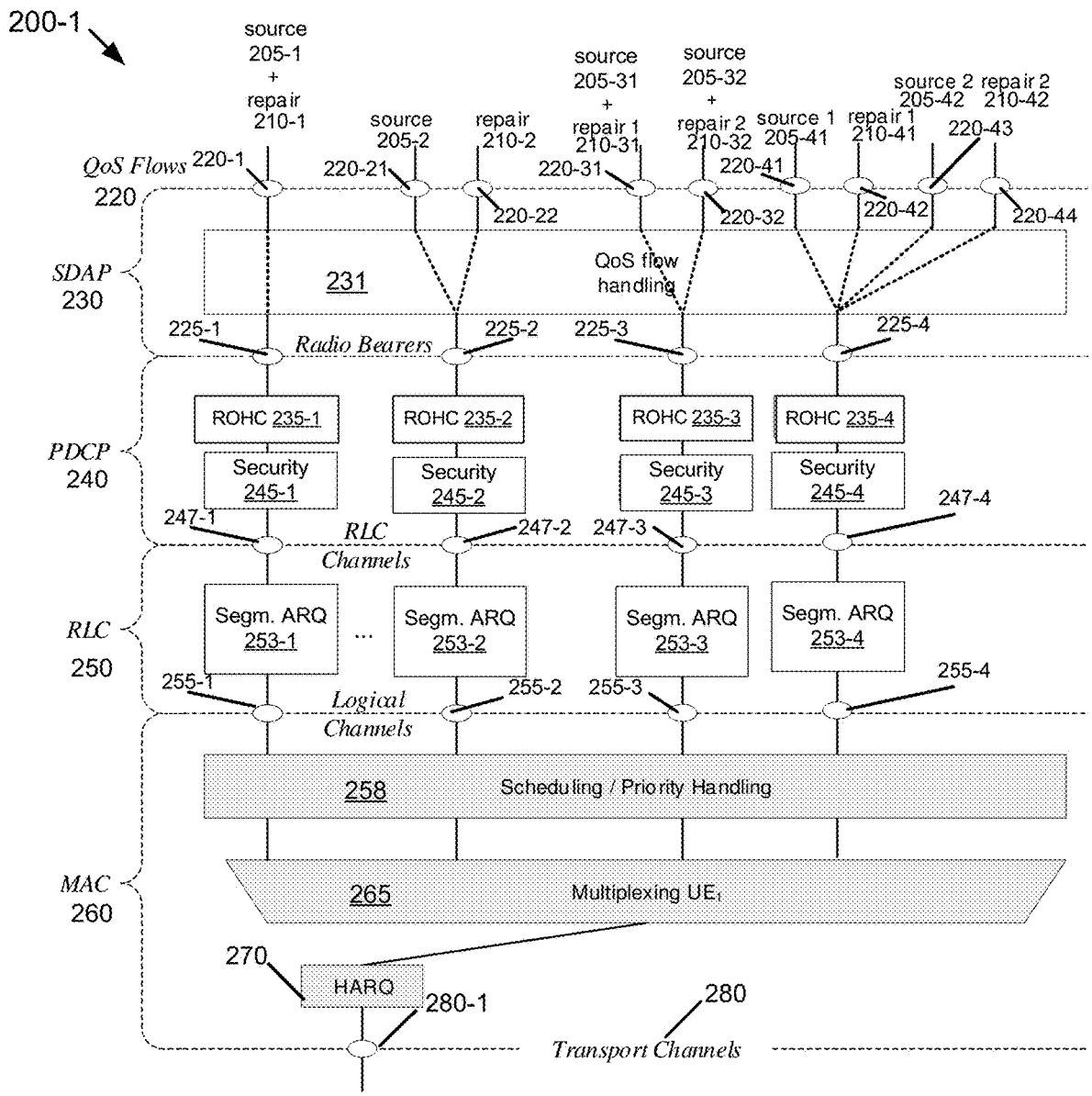
FIG. 2 is an example illustrating source and repair streams mapping to a single bearer (e.g., a PDCP entity) in layers of a protocol stack, in an exemplary embodiment.

As previously stated, in a first scenario, it is assumed that only one PDCP entity and one radio bearer is used. This provides four mapping options between source streams, repair streams, and QoS flows to the one bearer (PDCP entity), as illustrated in FIG. 2. The intention with respect to FIG. 2 is only to describe four alternatives, not to assume a single UE ($UE_1$ 110 in this example) will be configured with all these four cases. Therefore, any one or a combination of the any or all of the four alternatives may be used, although all four are described for completeness.

FIG. 2 is an example illustrating source and repair streams mapping to a single bearer (e.g., a PDCP entity) in layers of a protocol stack 200-1, in an exemplary embodiment. The protocol stack 200-1 is implemented by the corresponding wireless device, in this example assumed to be the RAN node 170 and its corresponding control module 150-2.

In this example, both source streams 205 and repair streams 210 for a single QoS flow 220 or multiple QoS flows 220 are communicated via a corresponding radio bearer 225. As one example, the source stream 205-1 and repair stream 210-1 (as one QoS flow 220-1) are communicated via radio bearer 225-1. In a second example, the source stream 205-2 and repair stream 210-2 (as two separate and corresponding QoS flows 220-21 and 220-22) are communicated via radio bearer 225-2. In a third example, the source stream 205-31 and repair stream 210-31 (as one QoS flow 220-31) and also the source stream 205-32 and repair stream 210-32 (as another QoS flow 220-32) are communicated via radio bearer 225-3. In a final example, the source stream 205-41 and repair stream 210-41 and also the source stream 205-42 and repair stream 210-42 have corresponding QoS flows 220-41, 220-42, 220-43, and 220-44 and are communicated via radio bearer 225-4. The QoS flow handling 231 in the SDAP layer 230 performs the mapping from the corresponding QoS flow 220 to a radio bearer 225.

Each of the radio bearers 225-1 through 225-4 is operated on separately until the multiplexing 265 at MAC layer for a $UE_1$ 110, as illustrated, or for multiple UEs for point-to-multipoint (PTM) transmission, which is not illustrated. The radio bearers 225-1 through 225-4 are operated on in the PCDP layer 240 by corresponding ones of the ROHC 235-1 through 235-4 and the security 245-1 through 245-4 (see, e.g., 3GPP TS 38.300), which outputs corresponding RLC channels 247-1 through 247-4. These RLC channels 247-1 through 247-4 are operated on in the RLC layer 250 by the Segm. (Segmentation) and ARQ 253-1 through 253-4 (see, e.g., 3GPP TS 38.300) into corresponding logical channels 255-1 through 255-4. In the MAC layer 260, scheduling/priority handling 258 is performed as is multiplexing 265 for $UE_1$ 110 (or for multiple UEs for PTM transmission), which results in a single output to which HARQ 270 is applied. This results in a transport channel 280-1 of the transport channels 280.

Before proceeding with additional description, it is helpful to review certain concepts about the protocol stack 200-1, which applies to any protocol stack 200. In particular, packets received by a layer are referred to as Service Data Units (SDUs), while the packets output from a layer are referred to by Protocol Data Units (PDUs). For instance, the PCDP layer 240 produces PDCP PDUs for the RLC channels 247. From the perspective of the RLC layer 250, the PDCP PDUs are RLC SDUs that, after processing by the RLC layer 250, become outputs of RLC PDUs on the logical channels 255.

Figure 3:
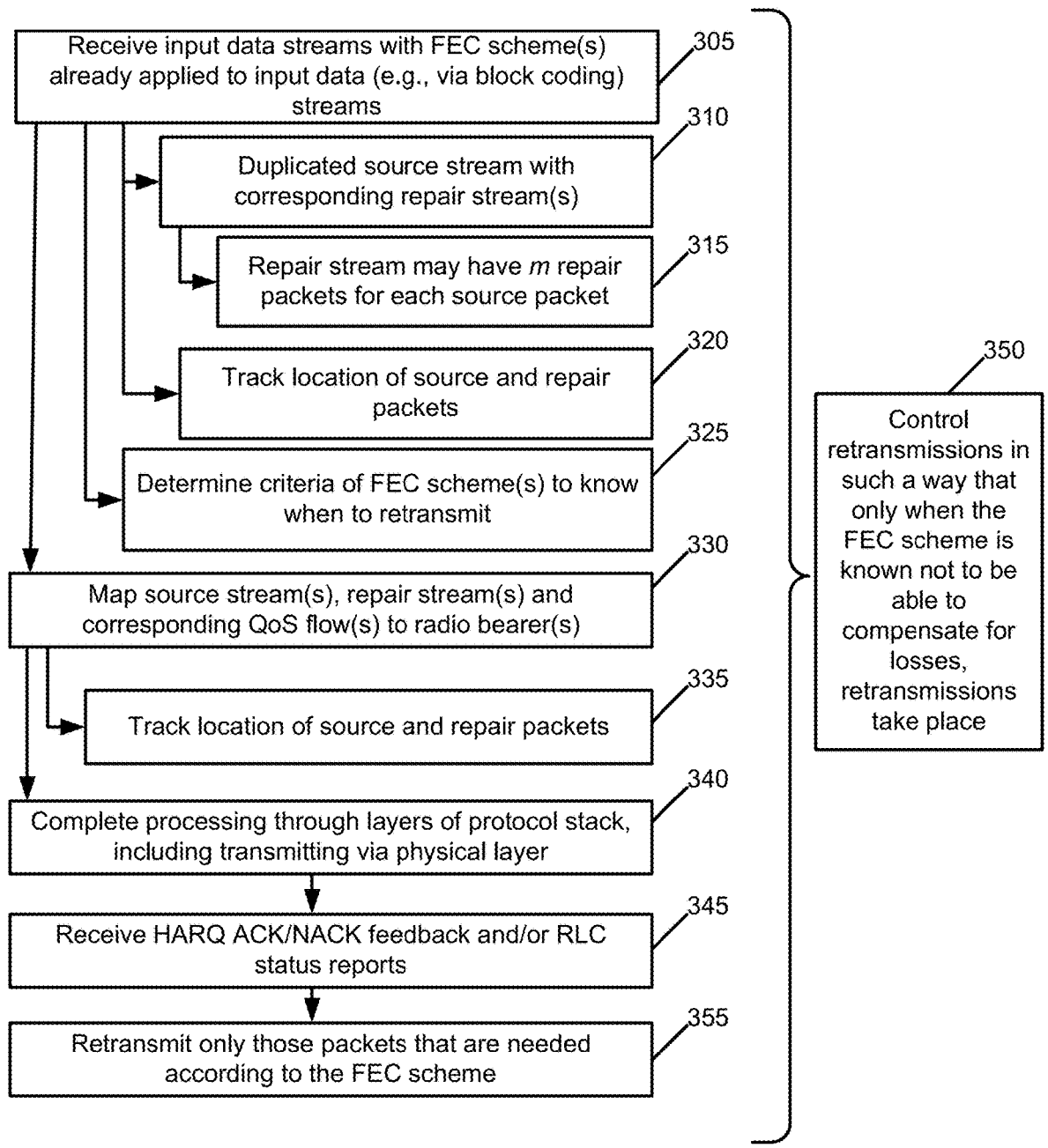
FIG. 3 is a logic flow diagram for forward error correction and ran retransmissions performed by a transmitter (e.g., a RAN node 170), and illustrates the operation of an exemplary method or methods, a result of execution of computer program instructions embodied on a computer readable memory, functions performed by logic implemented in hardware, and/or interconnected means for performing functions in accordance with exemplary embodiments.

As part of additional description of the first scenario, turn to FIG. 3, which is a logic flow diagram for forward error correction and RAN retransmissions performed by a transmitter (e.g., a RAN node 170). FIG. 3 illustrates the operation of an exemplary method or methods, a result of execution of computer program instructions embodied on a computer readable memory, functions performed by logic implemented in hardware, and/or interconnected means for performing functions in accordance with exemplary embodiments. FIG. 3 is assumed to be performed by a RAN node 170, under control of the control module 150.

It is noted that the exemplary embodiments are directed to the RAN node 170 or other transmitter, as MBS is targeted in an exemplary embodiment, and these are DL services. FEC could also be used in UL for something else, however.

As an overview, in the transmitter, such as the RAN node 170 in downlink, RLC status reports and HARQ ACK/NACK feedback from the receiver (the UE 110 in this example) or multiple receivers are processed and it is assessed whether PDUs need to be retransmitted from an ARQ/HARQ viewpoint, but then only the PDUs really needed (according to the FEC) are retransmitted. Another step is therefore added on top of existing retransmission mechanisms to prohibit retransmissions of PDUs whose content can already be recovered by the FEC. In addition, the transmitter processes the status reports and ACK/NACK of all UEs and determines whether to use PTP or PTM retransmission.

This does not require the RLC and MAC layers of the receiver to be aware of the FEC capabilities but does require that the transmitter keep track of the location (e.g., sequence numbers of corresponding RLC/MAC PDUs) of the source and corresponding repair packets(s) in each RLC PDU and/or MAC PDU and to indicate when to give up waiting for possible retransmissions, for instance by using some of the methods described in WO2014161804A1 and WO2017182704A1 to move the receive window forward.

In block 305 of FIG. 3, the RAN node 170 receives input data with FEC scheme already applied, i.e., source and repair streams (e.g., via block coding). In particular, this may a source stream duplicated with a corresponding repair stream or streams. See block 310. The FEC scheme in some exemplary embodiments includes m repair packets, in the repair stream, for each source packet. See block 315. In some other exemplary embodiments, the FEC scheme may include m repair blocks for n source blocks or m repair symbols (e.g., in repair packets) for n source symbols (e.g., in source packets). As previously described, tracking (see block 320) is performed of location of source and repair blocks in each PDU and/or transport block. Note that the operations in this block may be performed at any time where the source and repair blocks have to be tracked. For instance, a similar operation is described below, but this operation is assumed to be performed anywhere tracking is necessary.

In block 325, one possibility when applying the FEC scheme is to determine criteria of FEC scheme(s) to know when to retransmit. The FEC scheme may include the applied FEC coding and/or the FEC code itself and the corresponding criteria, such as number of repair packets (or even bits or symbols) needed per source packets, may be determined.

In block 330, the RAN node 170 maps source stream(s), repair stream(s) and corresponding QoS flow(s)s to radio bearer(s). Block 330 may also involve tracking location of source and repair packets (e.g., in each PDU), as in block 335 and as previously described.

The RAN node 170 in block 340 completes processing through layers of the protocol stack (e.g., 200-1), including transmitting via the physical layer (not shown in FIG. 2, but below the transport channels 280). In block 345, the RAN node 170 receives HARQ ACK/NACK feedback and/or also RLC status reports. In block 355, the RAN node 170 retransmits only those blocks (e.g., packets) that are needed according to the FEC scheme.

In more general terms, the flow diagram of FIG. 3 may be thought of as controlling retransmissions in such a way that only when the FEC is known not to be able to compensate for losses, retransmissions take place. See block 350.

FIGS. 2 and 3 show examples where the FEC scheme is applied before the data (source and repair streams) arrive to the RAN node 170. In another exemplary embodiment, the FEC scheme could be applied in the RAN node, for instance, at the PDCP layer 240 or at the RLC layer 250 above the ARQ function 253. In that case, the RAN node 170 may receive only source packets and may not receive repair packets. In that case also, the RAN node could generate m repair symbols for each received n source symbols. Furthermore, tracking of source and repair symbols could be simple in the RAN node 170 since RAN node itself generates the repair symbols. Also, the properties, e.g., error correction capabilities, of the FEC scheme would be readily available in the RAN node.

Figure 3A:
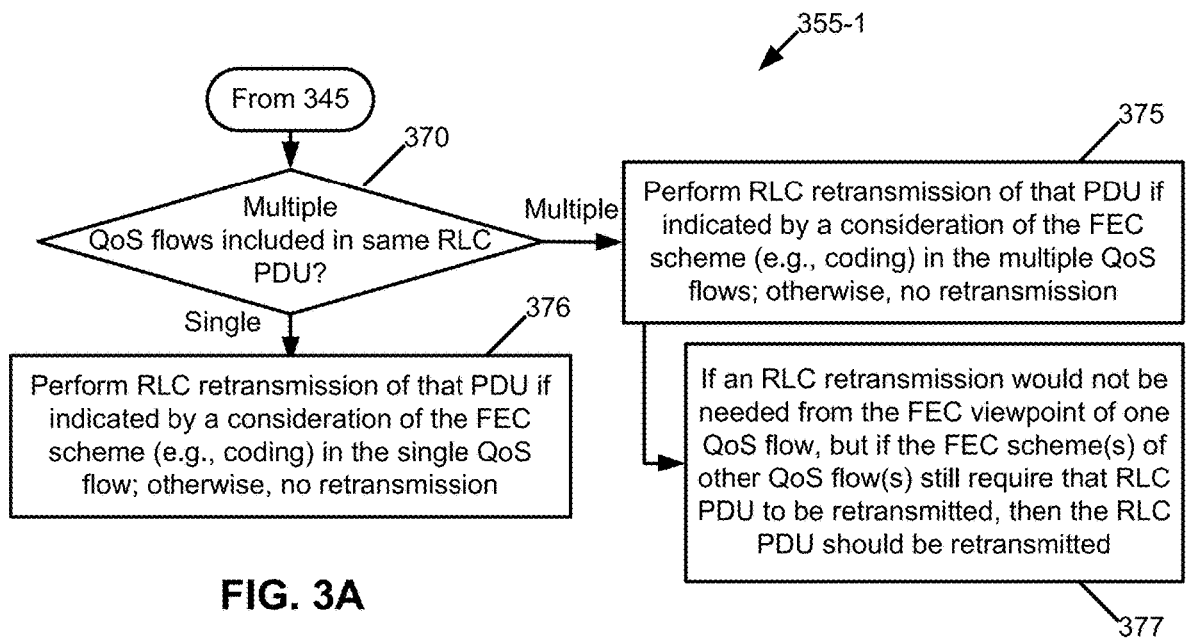
Figure 3B:
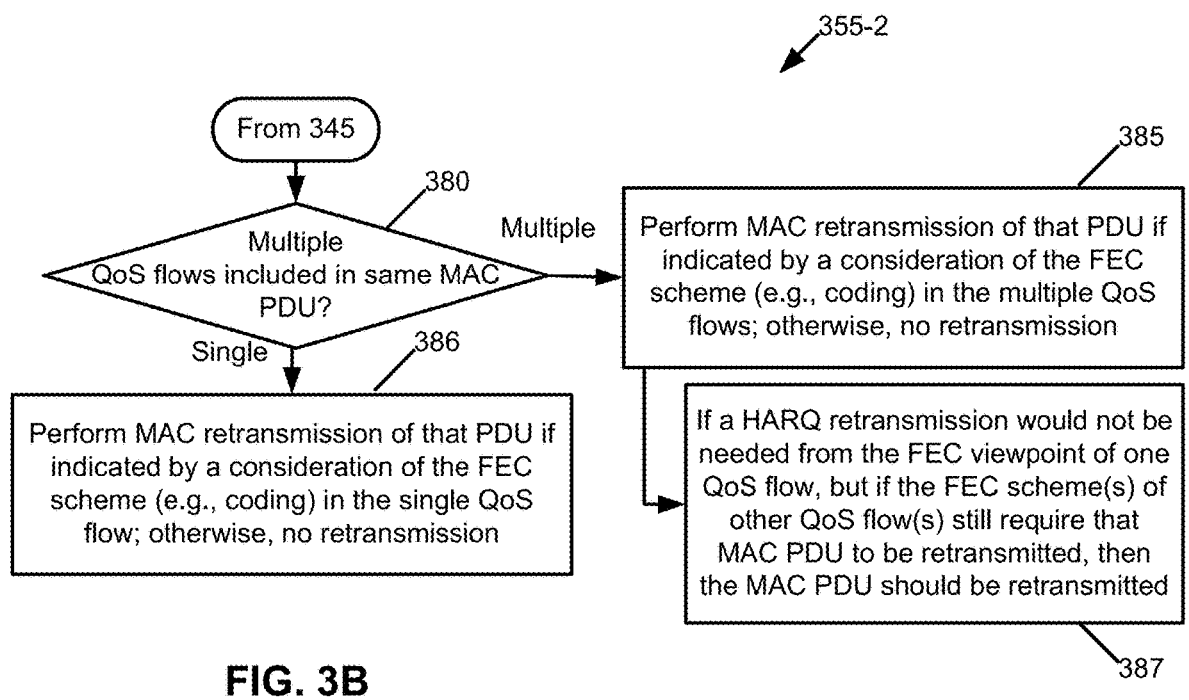

FIGS. 3A and 3B are alternative or additional options for performing block 355 of FIG. 3, in accordance with exemplary embodiments. These options are now described.

Refer to FIG. 3A, when multiple QoS flows are included in the same RLC PDU, the individual FEC criteria of each QoS flow should be considered when deciding a possible RLC retransmission of that PDU. For instance, this means that even though an RLC retransmission would not be needed from the FEC viewpoint of one QoS flow (as the FEC already possesses enough information to recover possible losses), if the FEC of other QoS flow(s) still require that RLC PDU to be retransmitted (because not enough information is possessed to correct these), then the RLC PDU should be retransmitted to avoid losses. Assuming that one source packet generates m repair packets, an RLC PDU should be retransmitted if for at least one of the included QoS flows, none of the source packet and none of the m repair packets associated with the packet included in the RLC PDU for that respective flow were previously acknowledged. On the other hand, the RLC PDU need not be retransmitted if, for each of the included QoS flows, at least one of the source packet or m repair packets associated with the packet included in the RLC PDU for that respective flow was previously acknowledged.

Naturally the network could decide to simplify the handling by not having multiple QoS flows included in the same RLC PDU.

Thus, as reference 355-1 indicates, in block 370, the RAN node 170 determines whether multiple QoS flows are included in the same RLC PDU. If so (block 370=Multiple), in block 375, the RAN node 170 performs RLC retransmission of that PDU if indicated by a consideration of the FEC scheme(s) (e.g., FEC coding(s)) in the multiple QoS flows; otherwise, no retransmission is performed. That is, no retransmission is performed if none of the FEC schemes requires that. Put differently, if one or more FEC scheme require the retransmission, then retransmission is performed. In block 377, if an RLC retransmission would not be needed from the FEC viewpoint of one QoS flow, but if the FEC scheme(s) of other QoS flow(s) still require that RLC PDU to be retransmitted, then the RLC PDU should be retransmitted.

If multiple QoS flows are not included in the same RLC PDU (block 370=Single), the flow proceeds to block 376. In block 376, the RAN node performs RLC retransmission of that PDU if indicated by a consideration of the FEC scheme (e.g., coding) in the single QoS flow; otherwise, no retransmission is performed.

Similarly, when multiple radio bearers are included in the same MAC PDU, the individual FEC criteria of each QoS flows of all the RLC PDUs multiplexed in that MAC PDU, should be considered. For instance, even though an HARQ retransmission would not be needed from the FEC viewpoint of one QoS flow (as the FEC already possesses enough information to recover possible losses), if the FEC of other QoS flow(s) require that PDU to be retransmitted (because there is not enough information to recover possible losses), then the PDU should be retransmitted to avoid losses. Assuming that one source packet generates m repair packets, a MAC PDU should be retransmitted if for at least one of the included QoS flows, none of the source packet and none of the m repair packets associated with the packet included in the MAC PDU for that respective flow were previously acknowledged, but need not be retransmitted if for each of the included QoS flows, at least one of the source packet or m repair packets associated with the packet included in the MAC PDU for that respective flow was previously acknowledged.

Here also, the network could decide to simplify the handling by not having multiple QoS included in the same MAC PDU.

In FIG. 3B, in block 380, the RAN node 170 determines whether multiple QoS flows are included in same MAC PDU. If so (block 380=Multiple), in block 385 the RAN node 170 perform MAC retransmission of that PDU if indicated by a consideration of the FEC scheme (e.g., FEC coding) in the multiple QoS flows; otherwise, no retransmission is performed. One example of block 385 is block 387, where if a HARQ retransmission would not be needed from the FEC viewpoint of one QoS flow, but if the FEC scheme(s) of other QoS flow(s) still require that MAC PDU to be retransmitted, then the MAC PDU should be retransmitted.

If multiple QoS flows are not included in the same MAC PDU (block 370=Single), the flow proceeds to block 386. In block 386, the RAN node 170 performs MAC retransmission of that PDU if indicated by a consideration of the FEC scheme (e.g., coding) in the single QoS flow; otherwise, no retransmission is performed.

In another alternative, assuming that the FEC scheme generates m repair packets for one source packet, and that the transmitter is aware of which PDCP SDUs are source packets and which SDUs are the corresponding m repair packets, the transmitter could ensure that each packet is contained within a single PDU (RLC or PDCP) and that the m repair packets corresponding to the same source packet use the same SN as the PDU carrying that source packet. Without any impact to the receiver, the first PDU (carrying the source packet or one of the corresponding m repair packets) will then be acknowledged while possibly others, naturally discarded. For this method to be most efficient, the source packet and corresponding m repair packets should be transmitted in different transport blocks.

This is illustrated by FIG. 3C. In block 395, if the FEC scheme generates m repair packets for one source packet, and the transmitter (e.g., the RAN node 170) is aware of which PDCP SDUs are source packets and which SDUs are the corresponding m repair packets, the transmitter (e.g., the RAN node 170) ensures that each packet is contained within a single PDU (RLC or PDCP) and that the m repair packets corresponding to the same source packet use the same SN as the PDU carrying that source packet.

This is an example (e.g., a special case) where the determination whether a retransmission is needed happens in the receiver side. In this special case, no changes are needed for the receiver. The receiver acknowledges every "SN" and a retransmission is requested only if none of the source or m repetitions is received correctly.

For example, assume there are three PDCP SDUs where PDCP SDU 1 carries a source packet, PDCP SDU 2 carriers a first repair packet and PDCP SDU 3 carries a second repair packet. The transmitter generates three PDCP/RLC PDUs, where each of these PDUs uses the same sequence number in the hearer.

The receiver may receive the third PDU at first, e.g., the first HARQ transmission was successful, while the first and the second PDU may be received later, e.g., due to HARQ retransmissions. In this situation, the receiver would assign the received PDU to the receive window and, if this PDU was the PDU with lowest expected sequence number (SN) in the window, advance the receive window. The same sequence number received in the header of the first and the second PDU would be then identified either as a PDU outside of the receive window or as a duplicate of PDU that is already in the receive window (buffer). In either case, the first and second PDUs will be discarded.

Alternatively, the control of retransmissions based on the FEC scheme could be implemented in the receiver (such as a UE 110). Then, a "fake" acknowledgement (i.e., RLC ACK or, if some ARQ-type of operation at PDCP is introduced, e.g., PDCP ACK) can be sent for a missing PDU when the FEC is known to be able to recover that missing PDU from the information already received (i.e., source and/or repair packet). As the receiver is not aware of the multiplexing decision of the gNB, nor can the receiver identify the content of a PDU the receiver has not received, this can only work above the MAC layer, with a fixed pattern of source/repair packets in PDUs known to the receiver and strictly followed by the sender.

Figure 4:
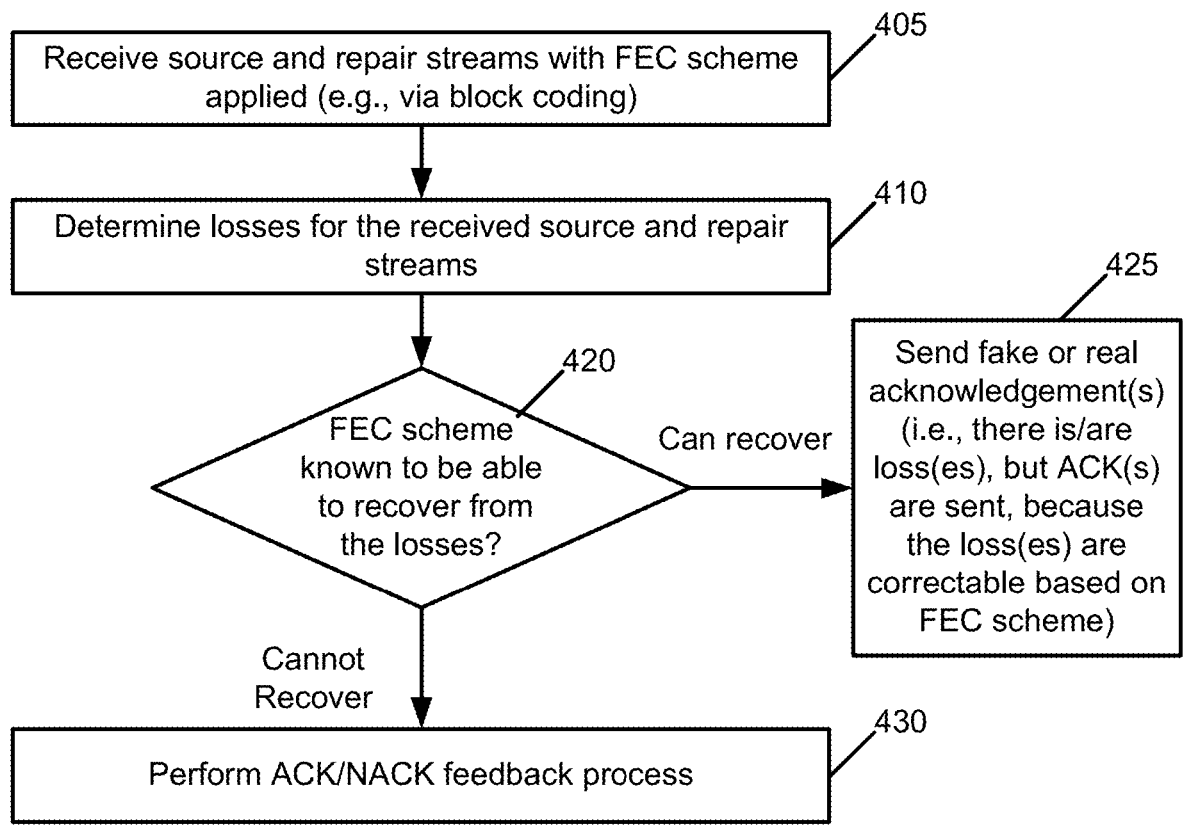
FIG. 4 is a logic flow diagram for forward error correction and ran retransmissions performed by a receiver (e.g., a UE 110), and illustrates the operation of an exemplary method or methods, a result of execution of computer program instructions embodied on a computer readable memory, functions performed by logic implemented in hardware, and/or interconnected means for performing functions in accordance with exemplary embodiments.

FIG. 4 is a logic flow diagram for forward error correction and RAN retransmissions performed by a receiver (e.g., a UE 110). This figure illustrates the operation of an exemplary method or methods, a result of execution of computer program instructions embodied on a computer readable memory, functions performed by logic implemented in hardware, and/or interconnected means for performing functions in accordance with exemplary embodiments. This is assumed to be performed by a UE 110, under control of the control module 140.

In block 405, the UE 110 receives source and repair packets (via corresponding source and repair streams) with the FEC scheme (or schemes) applied (e.g., via block coding). The UE 110 determines losses for the received source and repair packets, via the source and repair streams, in block 410. The UE 110, in block 420, determines whether the applied FEC scheme is known to be able to recover from the corresponding losses.

If so (block 420=can recover), the UE 110 sends fake or real acknowledgement(s) toward the RAN node 170. That is, there are losses, but ACK(s) are sent, because the losses are correctable based on the FEC scheme. If the FEC scheme is known not to be able to recover from the losses (block 420=cannot recover), the UE 110 performs a "normal" ACK/NACK feedback process, i.e., request retransmission of at least some of the lost packets. In further detail, the outcome of the determination could be that the already-received packets are not enough to correct losses but also that not all missing packets need to retransmitted (i.e., some of the packets have been correctly received.) In more detail, using the example above with one source and two repair packets, if only one source and one repair packet are received, but this is enough to correct errors according to the FEC scheme, then a UE 110 can send actual ACKs for the one source and one repair packet that were received, but the UE would also send a fake ACK for the one repair packet that was not received.

As stated above, as the receiver is not aware of the multiplexing decision of the gNB, nor can the receiver identify the content of a PDU the receiver has not received, the techniques of FIG. 4 can only work above the MAC layer, with a fixed pattern of source/repair packets in PDUs known to the receiver and strictly followed by the sender. For instance, if the receiver knows that a PDCP PDU containing a source packet is always followed by m PDCP PDUs containing repair packets corresponding to that source packet, that the same pattern follows at RLC (i.e., that an RLC PDU containing a source packet is always followed by m RLC PDUs containing repair packets), the receiver (e.g., UE 110) knows that:

1) The receiver only needs to correctly receive one amongst a plurality of m+1 consecutive PDCP PDUs and can alter PDCP status reports accordingly; and 2) The receiver only needs to correctly receive one amongst a plurality of m+1 consecutive RLC PDUs and can send a fake RLC acknowledgement accordingly.

Obviously, this also requires the starting point to be common for both the transmitter and receiver, for instance by always starting with a source packet (i.e., the SN of PDUs containing a source packet have an SN modulo m+1=0).

Figure 4A:
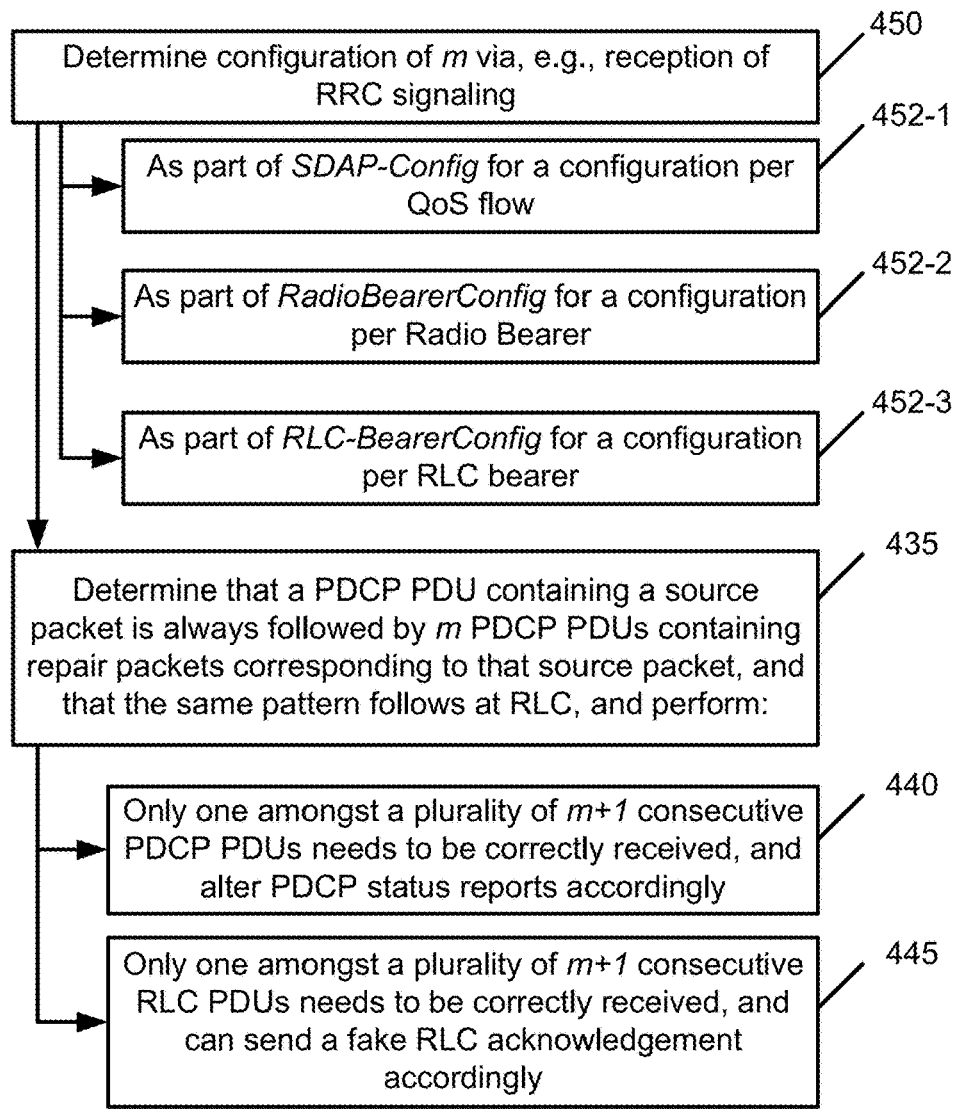
FIGS. 4A, 4B, and 4C are alternative or additional options for performing block 415 of FIG. 4, in accordance with exemplary embodiments.

One example is illustrated by FIG. 4A, which illustrates reference 415-1, which is a version of block 415 of FIG. 4. In block 435, if the receiver such as the UE 110 knows that a PDCP PDU containing a source packet is always followed by m PDCP PDUs containing repair packets corresponding to that source packet, and that the same pattern follows at RLC, the UE knows that the following may be performed:

1) The UE 110 only needs to correctly receive one amongst a plurality of m+1 consecutive PDCP PDUs and can alter PDCP status reports accordingly, see block 440.

2) The UE 110 only needs to correctly receive one amongst a plurality of m+1 consecutive RLC PDUs and can send a fake RLC acknowledgement accordingly, see block 445.

Assuming these criteria, the value of m could then be configured through RRC signaling, for instance (see block 450):

1) As part of SDAP-Config for a configuration per QoS flow, block 452-1.

2) As part of RadioBearerConfig for a configuration per Radio Bearer, block 452-2.

3) As part of RLC-BearerConfig for a configuration per RLC bearer, block 452-3.

Alternatively or additionally, the SDAP/PDCP/RLC header could contain some information identifying types of packets from an FEC perspective. Using the same example as above, source packets could be identified with "0" (zero) and repair packet(s) with "1 . . . m". That information combined with the knowledge that repair packet(s) always follows a source packet allows the receiver to send the fake acknowledgement.

Figure 4B:
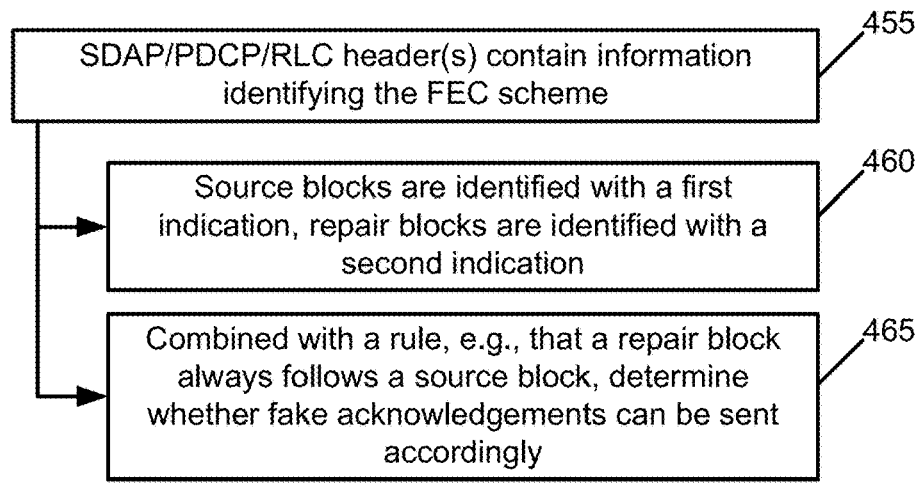

This is illustrated by FIG. 4B, which illustrates reference 415-2, which is a version of block 415 of FIG. 4. In block 455, the SDAP/PDCP/RLC header(s) contain information identifying the packets from the FEC scheme perspective. The source blocks are identified with a first indication (e.g., "0" as above), and the repair blocks are identified with one or more second indications (e.g., "1 . . . m" as above, where m≥1), see block 460. In block 465, combined with a rule, e.g., that a repair block always follows a source block, the UE 110 determines whether fake acknowledgements can be sent accordingly.

In the description above, a FEC scheme with a source packet and one or several repair packets has been used as an example. This can be generalized to other FEC schemes, where instead of a single source packet and m repair packets, there could be n source packets which are encoded into m packets. Examples of such codes are so called network codes or Fountain codes, e.g., Raptor codes defined in RFC 5053 or RaptorQ codes defined in RFC 6330. The codes are such that, with high probability, it is possible to decode the source block (consisting of n source packets) correctly when receiving any n packets out of m encoded packets.

When such codes are used and if the transmitter knows the code block boundaries, i.e., if the transmitter knows which packets are the n source packets and which packets are the corresponding m-n repair packets, then the transmitter simply has to take care that (at least) n packets out of the encoded m packets are received correctly. If the FEC scheme is applied at a higher layer and the transmitter (PDCP or RLC) does not know the exact code boundaries but knows that there are always n source packets followed by m-n repair packets, then the transmitter has to take care that at maximum m-n erroneous packets can be allowed in any sliding window of m packets.

If a receiver-based scheme is applied and the FEC boundaries of such code are not known in the receiver but instead only the FEC block code properties (n source packets encoded into m encoded packets, i.e., n source packets plus (m-n) repair packets) then up to m-n erroneous packets can be allowed in any sliding window of m packets. That is, when a new packet is received in error, the retransmission is requested if there are more than m-n-1 packets in error among the m-1 packets received before the current packet. If a packet is received in error and retransmission has been requested for this packet, the packet can be considered by the receiver either as correctly received (assuming that the retransmission will be received correctly) or as an error packet, depending on the evaluation of the sliding window of m-1 most recent packets (i.e., the m-1 packets with the highest sequence numbers) and on the policy of the system. To clarify, when the transmitter sends NACK then it takes some time, at minimum RTT (round trip time), before the retransmission of a NACK packet can be received. During that time, the receiver may receive new packets and must perform the evaluation of the m-1 packets. Further, here the term "packet" means a PDU, because PDU only contains one packet as described above.

Figure 4C:
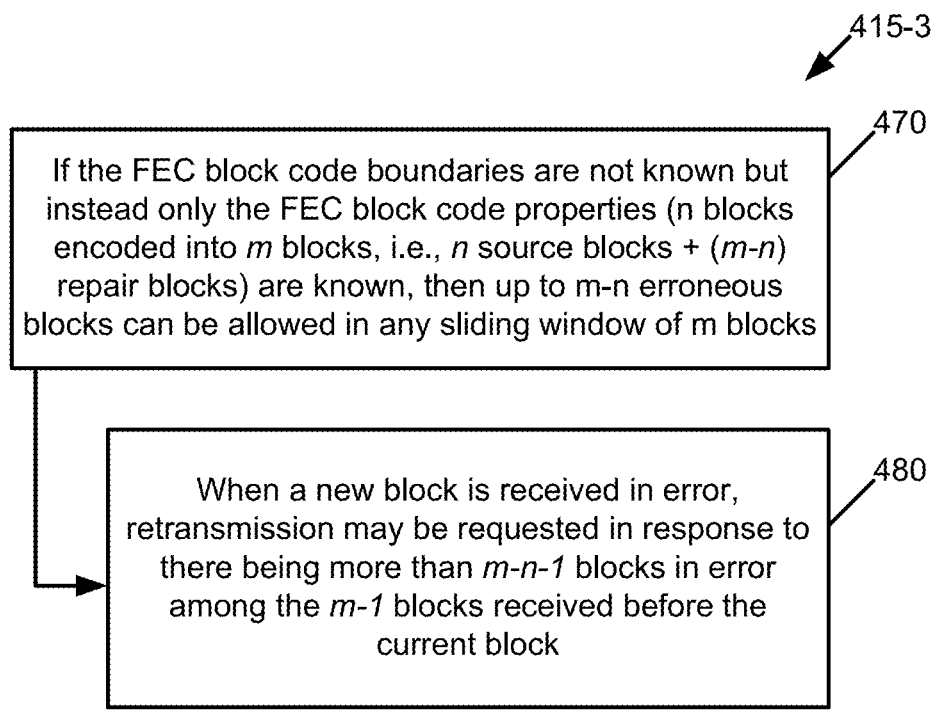

See FIG. 4C, which illustrates reference 415-3, which is a version of block 415 of FIG. 4. In block 470, if the FEC block code boundaries are not known but instead only the FEC block code properties (n blocks encoded into m blocks, i.e., n source blocks+(m-n) repair blocks) then up to m-n erroneous blocks can be allowed in any sliding window of m blocks. In block 480, when a new block is received in error, retransmission may be requested in response to there being more than m-n-1 blocks in error among the m-1 blocks received before the current block.

Figure 5:
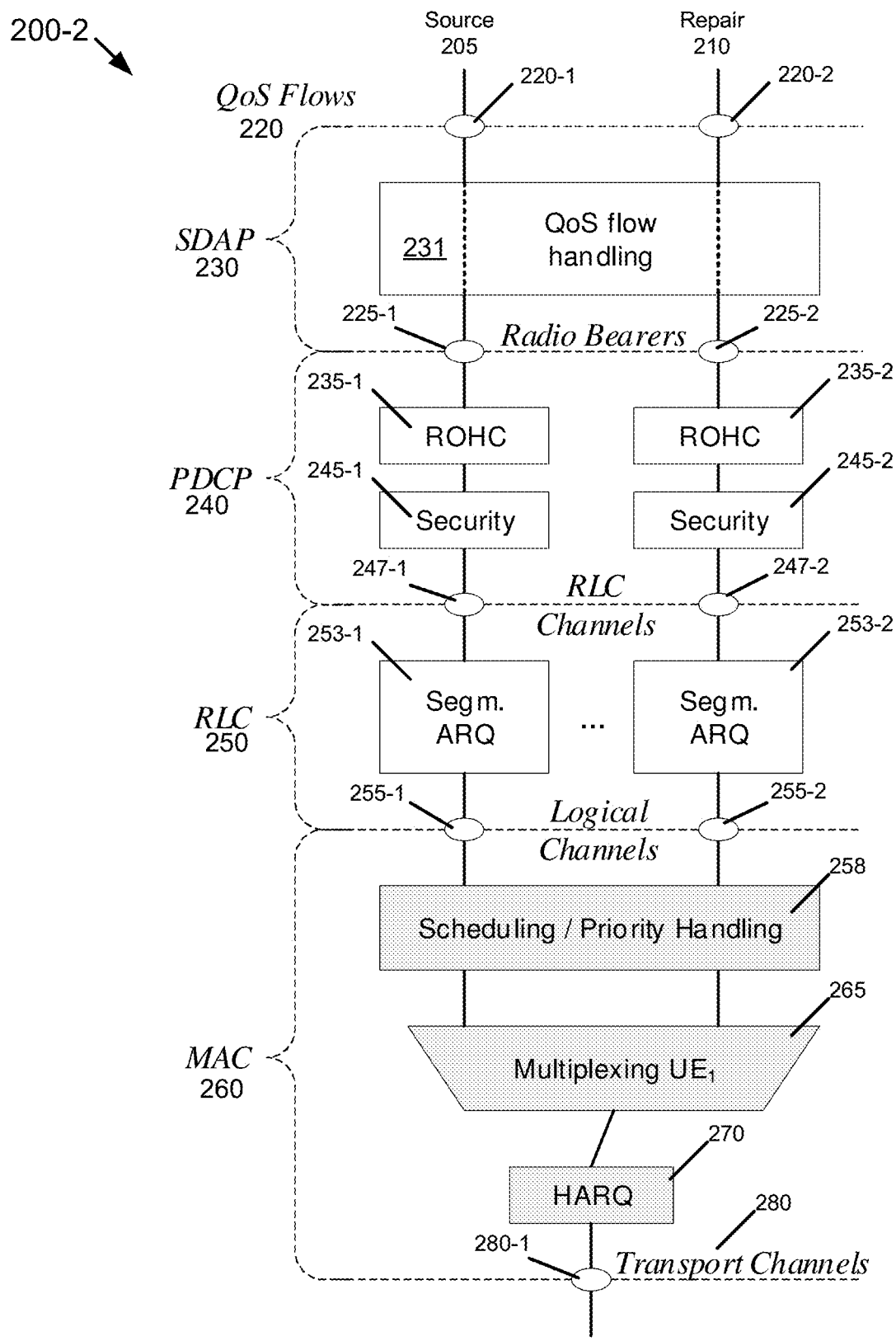
FIG. 5 is an example illustrating source and repair stream mapping to individual bearers (e.g., PDCP entities) in layers of a protocol stack, in an exemplary embodiment.

In a second scenario, it is assumed that source and repair streams are delivered to RAN via individual QoS flows, and the QoS flows are mapped to individual bearers (individual PDCP entities) as illustrated using the protocol stack 200-2 in FIG. 5. This figure is similar to FIG. 2, but in this example, a source stream 205 corresponds to QoS flow 220-1 and radio bearer 225-1, and a repair stream 210 corresponds to QoS flow 220-2 and radio bearer 225-2. The rest of the layers 230, 240, 250, and 260 are similar to what is illustrated in FIG. 2.

The transmitter can still process ACK/NACK feedback from the receiver for each bearer to assess whether PDUs need to be retransmitted from an ARQ/HARQ viewpoint, and then determine jointly for the two bearers (e.g., in RLC) what SDU (e.g., RLC SDUs) need to be retransmitted on each bearer.

An example is illustrated in FIG. 3D, which is a version 355-3 of block 355 of FIG. 3. In block 381, the RAN node 170 processes ACK/NACK feedback normally for each bearer. The RAN node 170 in block 383 determines jointly for the two bearers (e.g., in RLC) what packets (e.g., RLC SDUs) need to be retransmitted on each bearer, based on the FEC scheme, and retransmits accordingly; otherwise, no retransmission is performed.

In MAC, RLC PDUs from the two bearers may be multiplexed in one MAC PDU. This situation is the same as if two RLC SDUs would be transmitted for a single bearer and the decision whether to retransmit the MAC PDU should consider the FEC scheme.

This is illustrated by FIG. 3E, which is a version 355-4 of block 355 of FIG. 3. In block 382, the RAN node 170 processes ACK/NACK feedback normally for each bearer, though with RLC PDUs from multiple bearers multiplexed into one MAC PDU. The RAN node 170 in block 384 determines jointly for the two bearers (e.g., in MAC) what packets (e.g., MAC SDUs) need to be retransmitted on each bearer, based on the FEC scheme, and retransmits accordingly; otherwise, no retransmission is performed.

Also, the alternative in which the same SN is used for source packet and corresponding one or more repair packets (see FIG. 3C), assuming there is at least one repair packet for one source packet, can be adopted for the case when independent bearers are used. In this alternative, the status reports received for one bearer can be used to update the transmitting RLC entity of the other bearer as well. In other words, a first sequence number of a PDU carrying a source packet of a first bearer corresponds to a second sequence number (i.e., a second sequence number=a first sequence number+delta, where delta can be zero) of a PDU carrying a corresponding repair packet of a second bearer. Thus, a status report received for the first bearer can be used to update the second bearer as well.

In the receiver, the fake acknowledgment could be sent for either bearer or both bearers for a missing PDU when the FEC scheme is known to be able to recover that missing PDU from information already received on both bearers (i.e., source or repair packet). This has been explained in reference to FIG. 4. In the example of simple duplication, either a same sequence number (SN) can be used for source and repair packets or the receiver is aware of the difference, which remains the same due to duplication, in the sequence numbering between PDUs carrying source and repair packets. Alternatively, both repair and source packets may be explicitly linked through additional information contained in the RLC/PDCP header. See, e.g., FIG. 4B. For instance, two bits of the SN would allow processing four different associations on the fly.

If the FEC block code boundaries are not known (see above in FIG. 4C), then the receiver should observe if less than m-n packets have been lost jointly, for both bearers in the sliding window of length m.

In a third scenario, there could be a single repair stream for multiple source streams, which is described in 3GPP TR 23.757 as follows: If several content streams are received, they will be transmitted as several outgoing streams, but a single FEC repair stream can be sent for all those content streams. It is assumed that these streams are delivered as separate QoS flows to the RAN. The transmitter solution requires the RAN to be able to identify which repair packets delivered in the single repair stream (e.g., a QoS flow) belongs/corresponds to which source packets delivered in the individual streams, and then the solutions for transmitter operation described above can be applied. If an FEC scheme is applied by the RAN, then this information is inherently known; otherwise, the RAN should be provisioned with the information in PDU headers of packets carrying repair packets at least. That is, a RAN node receiving source and repair streams means that FEC scheme is applied outside of RAN node. Then, the transmitter can operate as described above.

The receiver naturally should know the applied FEC scheme and how to decode the scheme, thus the receiver can operate as described above for the first and second scenarios.

In all embodiments and alternatives above, it should be understood that while the granularity in user plane protocols is at PDU/SDU level, the criteria for selecting the packets can be based on the symbols contained within each packet and that, for instance, when enough symbols have been received through one or several packets, another packet can be declared as not needed when knowing that the symbols the packet carries are not needed.

The following are additional examples.

Example 1. A method, comprising:
  by a network node in a wireless network, for a source stream of input data where one or more forward error correction schemes have been used to create a repair stream corresponding to the source stream, transmitting by the network node one or more packets comprising data of the source stream or the corresponding repair stream packaged as at least part of one or more protocol data units;
  applying an automatic repeat request or hybrid automatic repeat request process to the one or more protocol data units;
  receiving by the network node feedback information as part of the process corresponding to the one or more protocol data units, the feedback information comprising positive acknowledgement/negative acknowledgement response for the one or more protocol data units; and
  controlling retransmissions of the one or more negatively acknowledged protocol data units when the forward error correction scheme is known not to be able to compensate for losses of one or more of the packets contained in the one or more protocol data units indicated as being negatively acknowledged by the feedback information.

Example 2. The method of example 1, wherein:
  the one or more packets, corresponding to multiple quality of services flows, are packaged as at least part of the one or more protocol data units for radio link control; and
  the controlling retransmissions comprises performing retransmission using radio link control of the one or more negatively acknowledged protocol data units in response to retransmission being indicated by a consideration of the one or more forward error correction schemes used in the multiple quality of service flows.

Example 3. The method of example 2, wherein the controlling retransmissions comprises, in response to a radio link control retransmission not being needed from a forward error correction viewpoint of one quality of service flow, but one or more forward error correction schemes of other quality of service flows still require that one or more negatively acknowledged protocol data units to be retransmitted, then retransmitting the one or more negatively acknowledged protocol data units.

Example 4. The method of example 1, wherein:
  the one or more packets, corresponding to a single quality of services flow, are packaged as at least part of the one or more protocol data units for radio link control; and
  the controlling retransmissions comprises performing radio link control retransmission of the one or more negatively acknowledged protocol data units in response to a retransmission being indicated by a consideration of a single forward error correction scheme applied to the single quality of service flow, otherwise, not performing radio link control retransmission of the one or more negatively acknowledged protocol data units.

Example 5. The method of example 1, wherein:
the one or more packets, corresponding to multiple quality of services flows, are packaged as at least part of the one or more protocol data units for medium access control; and
the controlling retransmissions comprises performing retransmission using medium access control of the one or more negatively acknowledged protocol data units in response to retransmission being indicated by a consideration of the one or more forward error correction schemes used in the multiple quality of service flows.

Example 6. The method of example 5, wherein the controlling retransmissions comprises, in response to a retransmission not being needed from a forward error correction viewpoint of one quality of service flow, but one or more the forward error correction schemes of other quality of service flows still require the one or more negatively acknowledged protocol data units to be retransmitted, then retransmitting the one or more negatively acknowledged protocol data units.

Example 7. The method of example 1, wherein:
the one or more packets, corresponding to a single quality of services flow, are packaged as at least part of one or more protocol data units for medium access control; and
the controlling retransmissions comprises performing medium access control retransmission of the one or more negatively acknowledged protocol data units in response to retransmission being indicated by a consideration of a single forward error correction scheme applied to the single quality of service flow; otherwise, not performing medium access control retransmission of the one or more negatively acknowledged protocol data units.

Example 8. The method of example 1, wherein:
the one or more packets are packaged as at least part of a service data unit;
the forward error correction scheme generates m repair packets for one source packet; and
the transmitting further comprises ensuring that each packet of the one or more packets is contained within a single protocol data unit corresponding to the service data unit and that the m repair packets corresponding to the same source packet use a same sequence number as the protocol data unit carrying that source packet.

Example 9. The method of any one of examples 1 to 8 wherein the source and corresponding repair stream are provided to the network node via individual quality of service flows, and the quality of service flows for one or more sets of source and corresponding repair streams are mapped to individual radio bearers.

Example 10. The method of example 1, wherein the source and corresponding repair stream are provided to the network node via individual quality of service flows, and the individual quality of service flows are mapped to two individual radio bearers, and wherein the controlling retransmissions further comprises:
processing the feedback information for the acknowledgement/negative acknowledgement response for each radio bearer for the two radio bearers; and
determining jointly for the two bearers what packets corresponding to a radio link control protocol data unit need to be retransmitted on each of the two bearers, based on the forward error correction scheme, and retransmitting accordingly.

Example 11. The method of example 1, wherein the source and corresponding repair stream are provided to the network node via individual quality of service flows, and the individual quality of service flows are mapped to individual radio bearers of two radio bearers, and wherein the controlling retransmissions further comprises:
processing the feedback information for the acknowledgement/negative acknowledgement response for each radio bearer for the two radio bearers, though with radio link control protocol data units from multiple bearers multiplexed into one media access control protocol data unit; and
determining jointly for the two bearers in media access control what packets at least partially comprised in the media access control protocol data unit need to be retransmitted on each of the two bearers, based on the forward error correction scheme, and retransmitting the media access control protocol data unit accordingly.

Example 12. The method of any one of examples 1 to 11, wherein controlling retransmissions of the one or more transmitted packets further comprises applying an automatic repeat request or hybrid automatic repeat request process to the one or more transmitted packets and controlling the retransmissions of any of the one or more transmitted packets indicated as being lost after the automatic repeat request or hybrid automatic repeat request process has been applied.

Example 13. The method of any one of examples 1 to 12, wherein the repair and corresponding source data stream are carried via a radio bearer that is configured to tolerate no losses.

Example 14. The method of any one of examples 1 to 13, further comprising applying by the network node the one or more forward error correction schemes to the source stream to create the repair stream corresponding to the source stream.

Example 15. A method, comprising:
by a user equipment in a wireless network, for a source stream of data where one or more forward error correction schemes have been used to create a repair stream corresponding to the source stream, receiving by the user equipment one or more packets comprising data of the source stream or the corresponding repair stream;
determining, by the user equipment, one or more losses corresponding to the one or more received packets for the received source stream and the corresponding repair stream;
determining by the user equipment whether the forward error correction scheme is known to be able to recover from the losses; and
in response to a determination the forward error correction scheme is known to be able to recover from the losses, sending by the user equipment at least one acknowledgement for any lost packets that correspond to the one or more losses.

Example 16. The method of example 15, wherein sending further comprises:
determining that a packet data convergence protocol protocol data unit containing a source packet is always followed by m packet data convergence protocol protocol data units containing repair packets corresponding to that source packet, and that a same pattern follows at radio link control, and perform:
based on only one amongst a plurality of m+1 consecutive packet data convergence protocol protocol data units needing to be correctly received, altering and sending packet data convergence protocol status reports accordingly; and
based on only one amongst a plurality of m+1 consecutive radio link control protocol data units needing to be correctly received, sending a radio link control acknowledgement accordingly.

Example 17. The method of example 16, further comprising the user equipment determining a configuration of m via reception of RRC signaling, comprising one of the following:
as part of SDAP-Config for a configuration per quality of service flow;
as part of RadioBearerConfig for a configuration per Radio Bearer; or
as part of radio link control-BearerConfig for a configuration per radio link control bearer.

Example 18. The method of example 15, wherein:
headers for the one or more received packets contain information identifying a corresponding forward error correction scheme applied;
determining by the user equipment whether the forward error correction scheme is known to be able to recover from the losses further comprises combining identification of the forward error correction scheme with a rule about the forward error correction scheme in order to determine whether one or more acknowledgements for lost packets can be sent accordingly.

Example 19. The method of example 18, wherein the headers comprise headers for one or more of service data adaptation protocol, packet data convergence protocol, or radio link control headers.

Example 20. The method of example 18 or 19 wherein the information identifying the forward error correction scheme identifies information from source streams with a first indication and identifies information from repair streams with a second indication.

Example 21. The method of example 15, wherein determining by the user equipment whether the forward error correction scheme is known to be able to recover from the losses further comprises:
in response to the forward error correction block code boundaries being not known but instead only the forward error correction block code properties where n source blocks are encoded into m repair blocks, then up to m-n erroneous blocks can be allowed in any sliding window of m blocks.

Example 22. The method of example 21, wherein determining by the user equipment whether the forward error correction scheme is known to be able to recover from the losses further comprises: in response to a new block being received in error, retransmission is requested in response to there being more than m−n−1 blocks in error among m−1 blocks received before a current block.

Example 23. The method of any one of examples 15 to 22, wherein sending by the user equipment at least one acknowledgement for any lost packets that correspond to the one or more losses comprises sending by the user equipment a number of acknowledgements that is less than a number of lost packets.

Example 24. An apparatus, comprising:
at least one processor; and
at least one memory including computer program code, the at least one memory and the computer program code configured, with the at least one processor, to cause the apparatus to:
by a network node in a wireless network, for a source stream of input data where one or more forward error correction schemes have been used to create a repair stream corresponding to the source stream, transmit by the network node one or more packets comprising data of the source stream or the corresponding repair stream packaged as at least part of one or more protocol data units;
apply an automatic repeat request or hybrid automatic repeat request process to the one or more protocol data units;
receive by the network node feedback information as part of the process corresponding to the one or more protocol data units, the feedback information comprising positive acknowledgement/negative acknowledgement response for the one or more protocol data units; and
control retransmissions of the one or more negatively acknowledged protocol data units when the forward error correction scheme is known not to be able to compensate for losses of one or more of the packets contained in the one or more protocol data units indicated as being negatively acknowledged by the feedback information.

Example 25. The apparatus of example 24, wherein:
the one or more packets, corresponding to multiple quality of services flows, are packaged as at least part of the one or more protocol data units for radio link control; and
the controlling retransmissions comprises performing retransmission using radio link control of the one or more negatively acknowledged protocol data units in response to retransmission being indicated by a consideration of the one or more forward error correction schemes used in the multiple quality of service flows.

Example 26. The apparatus of example 25, wherein the controlling retransmissions comprises, in response to a radio link control retransmission not being needed from a forward error correction viewpoint of one quality of service flow, but one or more forward error correction schemes of other quality of service flows still require that one or more negatively acknowledged protocol data units to be retransmitted, then retransmitting the one or more negatively acknowledged protocol data units.

Example 27. The apparatus of example 24, wherein:
the one or more packets, corresponding to a single quality of services flow, are packaged as at least part of the one or more protocol data units for radio link control; and
the controlling retransmissions comprises performing radio link control retransmission of the one or more negatively acknowledged protocol data units in response to a retransmission being indicated by a consideration of a single forward error correction scheme applied to the single quality of service flow, otherwise, not performing radio link control retransmission of the one or more negatively acknowledged protocol data units.

Example 28. The apparatus of example 24, wherein:
the one or more packets, corresponding to multiple quality of services flows, are packaged as at least part of the one or more protocol data units for medium access control; and
the controlling retransmissions comprises performing retransmission using medium access control of the one or more negatively acknowledged protocol data units in response to retransmission being indicated by a consideration of the one or more forward error correction schemes used in the multiple quality of service flows.

Example 29. The apparatus of example 28, wherein the controlling retransmissions comprises, in response to a retransmission not being needed from a forward error correction viewpoint of one quality of service flow, but one or more the forward error correction schemes of other quality of service flows still require the one or more negatively acknowledged protocol data units to be retransmitted, then retransmitting the one or more negatively acknowledged protocol data units.

Example 30. The apparatus of example 24, wherein:
the one or more packets, corresponding to a single quality of services flow, are packaged as at least part of one or more protocol data units for medium access control; and
the controlling retransmissions comprises performing medium access control retransmission of the one or more negatively acknowledged protocol data units in response to retransmission being indicated by a consideration of a single forward error correction scheme applied to the single quality of service flow; otherwise, not performing medium access control retransmission of the one or more negatively acknowledged protocol data units.

Example 31. The apparatus of example 24, wherein:
the one or more packets are packaged as at least part of a service data unit;
the forward error correction scheme generates m repair packets for one source packet; and
the transmitting further comprises ensuring that each packet of the one or more packets is contained within a single protocol data unit corresponding to the service data unit and that the m repair packets corresponding to the same source packet use a same sequence number as the protocol data unit carrying that source packet.

Example 32. The apparatus of any one of examples 24 to 31, wherein the source and corresponding repair stream are provided to the network node via individual quality of service flows, and the quality of service flows for one or more sets of source and corresponding repair streams are mapped to individual radio bearers.

Example 33. The apparatus of example 24, wherein the source and corresponding repair stream are provided to the network node via individual quality of service flows, and the individual quality of service flows are mapped to two individual radio bearers, and wherein the controlling retransmissions further comprises:
processing the feedback information for the acknowledgement/negative acknowledgement response for each radio bearer for the two radio bearers; and
determining jointly for the two bearers what packets corresponding to a radio link control protocol data unit need to be retransmitted on each of the two bearers, based on the forward error correction scheme, and retransmitting accordingly.

Example 34. The apparatus of example 24, wherein the source and corresponding repair stream are provided to the network node via individual quality of service flows, and the individual quality of service flows are mapped to individual radio bearers of two radio bearers, and wherein the controlling retransmissions further comprises:
processing the feedback information for the acknowledgement/negative acknowledgement response for each radio bearer for the two radio bearers, though with radio link control protocol data units from multiple bearers multiplexed into one media access control protocol data unit; and
determining jointly for the two bearers in media access control what packets at least partially comprised in the media access control protocol data unit need to be retransmitted on each of the two bearers, based on the forward error correction scheme, and retransmitting the media access control protocol data unit accordingly.

Example 35. The apparatus of any one of examples 24 to 34, wherein controlling retransmissions of the one or more transmitted packets further comprises applying an automatic repeat request or hybrid automatic repeat request process to the one or more transmitted packets and controlling the retransmissions of any of the one or more transmitted packets indicated as being lost after the automatic repeat request or hybrid automatic repeat request process has been applied.

Example 36. The apparatus of any one of examples 24 to 35, wherein the repair and corresponding source data stream are carried via a radio bearer that is configured to tolerate no losses.

Example 37. The apparatus of any one of examples 24 to 36, wherein the at least one memory and the computer program code configured, with the at least one processor, to cause the apparatus to perform: applying by the network node the one or more forward error correction schemes to the source stream to create the repair stream corresponding to the source stream.

Example 38. An apparatus, comprising:
at least one processor; and
at least one memory including computer program code,
the at least one memory and the computer program code configured, with the at least one processor, to cause the apparatus to:
by a user equipment in a wireless network, for a source stream of data where one or more forward error correction schemes have been used to create a repair stream corresponding to the source stream, receive by the user equipment one or more packets comprising data of the source stream or the corresponding repair stream;
determine, by the user equipment, one or more losses corresponding to the one or more received packets for the received source stream and the corresponding repair stream;
determine by the user equipment whether the forward error correction scheme is known to be able to recover from the losses; and
in response to a determination the forward error correction scheme is known to be able to recover from the losses, send by the user equipment at least one acknowledgement for any lost packets that correspond to the one or more losses.

Example 39. The apparatus of example 38, wherein sending further comprises:
determining that a packet data convergence protocol data unit containing a source packet is always followed by m packet data convergence protocol protocol data units containing repair packets corresponding to that source packet, and that a same pattern follows at radio link control, and perform:
based on only one amongst a plurality of m+1 consecutive packet data convergence protocol data units needing to be correctly received, altering and sending packet data convergence protocol status reports accordingly; and based on only one amongst a plurality of m+1 consecutive radio link control protocol data units needing to be correctly received, sending a radio link control acknowledgement accordingly.

Example 40. The apparatus of example 39, wherein the at least one memory and the computer program code configured, with the at least one processor, to cause the apparatus to perform: the user equipment determining a configuration of m via reception of RRC signaling, comprising one of the following:
  as part of SDAP-Config for a configuration per quality of service flow;
  as part of RadioBearerConfig for a configuration per Radio Bearer; or
  as part of radio link control-BearerConfig for a configuration per radio link control bearer.

Example 41. The apparatus of example 38, wherein:
headers for the one or more received packets contain information identifying a corresponding forward error correction scheme applied;
determining by the user equipment whether the forward error correction scheme is known to be able to recover from the losses further comprises combining identification of the forward error correction scheme with a rule about the forward error correction scheme in order to determine whether one or more acknowledgements for lost packets can be sent accordingly.

Example 42. The apparatus of example 41, wherein the headers comprise headers for one or more of service data adaptation protocol, packet data convergence protocol, or radio link control headers.

Example 43. The apparatus of example 41 or 42 wherein the information identifying the forward error correction scheme identifies information from source streams with a first indication and identifies information from repair streams with a second indication.

Example 44. The apparatus of example 38, wherein determining by the user equipment whether the forward error correction scheme is known to be able to recover from the losses further comprises:
  in response to the forward error correction block code boundaries being not known but instead only the forward error correction block code properties where n source blocks are encoded into m repair blocks, then up to m-n erroneous blocks can be allowed in any sliding window of m blocks.

Example 45. The apparatus of example 44, wherein determining by the user equipment whether the forward error correction scheme is known to be able to recover from the losses further comprises: in response to a new block being received in error, retransmission is requested in response to there being more than m−n−1 blocks in error among m−1 blocks received before a current block.

Example 46. The apparatus of any one of examples 38 to 45, wherein sending by the user equipment at least one acknowledgement for any lost packets that correspond to the one or more losses comprises sending by the user equipment a number of acknowledgements that is less than a number of lost packets.

Example 47. An apparatus, comprising means for performing:
  by a network node in a wireless network, for a source stream of input data where one or more forward error correction schemes have been used to create a repair stream corresponding to the source stream, transmitting by the network node one or more packets comprising data of the source stream or the corresponding repair stream packaged as at least part of one or more protocol data units;
  applying an automatic repeat request or hybrid automatic repeat request process to the one or more protocol data units;
  receiving by the network node feedback information as part of the process corresponding to the one or more protocol data units, the feedback information comprising positive acknowledgement/negative acknowledgement response for the one or more protocol data units; and
  controlling retransmissions of the one or more negatively acknowledged protocol data units when the forward error correction scheme is known not to be able to compensate for losses of one or more of the packets contained in the one or more protocol data units indicated as being negatively acknowledged by the feedback information.

Example 48. The apparatus of example 47, wherein:
the one or more packets, corresponding to multiple quality of services flows, are packaged as at least part of the one or more protocol data units for radio link control; and
the controlling retransmissions comprises performing retransmission using radio link control of the one or more negatively acknowledged protocol data units in response to retransmission being indicated by a consideration of the one or more forward error correction schemes used in the multiple quality of service flows.

Example 49. The apparatus of example 48, wherein the controlling retransmissions comprises, in response to a radio link control retransmission not being needed from a forward error correction viewpoint of one quality of service flow, but one or more forward error correction schemes of other quality of service flows still require that one or more negatively acknowledged protocol data units to be retransmitted, then retransmitting the one or more negatively acknowledged protocol data units.

Example 50. The apparatus of example 47, wherein:
the one or more packets, corresponding to a single quality of services flow, are packaged as at least part of the one or more protocol data units for radio link control; and
the controlling retransmissions comprises performing radio link control retransmission of the one or more negatively acknowledged protocol data units in response to a retransmission being indicated by a consideration of a single forward error correction scheme applied to the single quality of service flow, otherwise, not performing radio link control retransmission of the one or more negatively acknowledged protocol data units.

Example 51. The apparatus of example 47, wherein:
the one or more packets, corresponding to multiple quality of services flows, are packaged as at least part of the one or more protocol data units for medium access control; and
the controlling retransmissions comprises performing retransmission using medium access control of the one or more negatively acknowledged protocol data units in response to retransmission being indicated by a consideration of the one or more forward error correction schemes used in the multiple quality of service flows.

Example 52. The apparatus of example 51, wherein the controlling retransmissions comprises, in response to a retransmission not being needed from a forward error correction viewpoint of one quality of service flow, but one or more the forward error correction schemes of other quality of service flows still require the one or more negatively acknowledged protocol data units to be retransmitted, then retransmitting the one or more negatively acknowledged protocol data units.

Example 53. The apparatus of example 47, wherein:
the one or more packets, corresponding to a single quality of services flow, are packaged as at least part of one or more protocol data units for medium access control; and
the controlling retransmissions comprises performing medium access control retransmission of the one or more negatively acknowledged protocol data units in response to retransmission being indicated by a consideration of a single forward error correction scheme applied to the single quality of service flow; otherwise, not performing medium access control retransmission of the one or more negatively acknowledged protocol data units.

Example 54. The apparatus of example 47, wherein:
the one or more packets are packaged as at least part of a service data unit;
the forward error correction scheme generates m repair packets for one source packet; and
the transmitting further comprises ensuring that each packet of the one or more packets is contained within a single protocol data unit corresponding to the service data unit and that the m repair packets corresponding to the same source packet use a same sequence number as the protocol data unit carrying that source packet.

Example 55. The apparatus of any one of examples 47 to 54, wherein the source and corresponding repair stream are provided to the network node via individual quality of service flows, and the quality of service flows for one or more sets of source and corresponding repair streams are mapped to individual radio bearers.

Example 56. The apparatus of example 47, wherein the source and corresponding repair stream are provided to the network node via individual quality of service flows, and the individual quality of service flows are mapped to two individual radio bearers, and wherein the controlling retransmissions further comprises:
processing the feedback information for the acknowledgement/negative acknowledgement response for each radio bearer for the two radio bearers; and
determining jointly for the two bearers what packets corresponding to a radio link control protocol data unit need to be retransmitted on each of the two bearers, based on the forward error correction scheme, and retransmitting accordingly.

Example 57. The apparatus of example 47, wherein the source and corresponding repair stream are provided to the network node via individual quality of service flows, and the individual quality of service flows are mapped to individual radio bearers of two radio bearers, and wherein the controlling retransmissions further comprises:
processing the feedback information for the acknowledgement/negative acknowledgement response for each radio bearer for the two radio bearers, though with radio link control protocol data units from multiple bearers multiplexed into one media access control protocol data unit; and
determining jointly for the two bearers in media access control what packets at least partially comprised in the media access control protocol data unit need to be retransmitted on each of the two bearers, based on the forward error correction scheme, and retransmitting the media access control protocol data unit accordingly.

Example 58. The apparatus of any one of examples 47 to 57, wherein controlling retransmissions of the one or more transmitted packets further comprises applying an automatic repeat request or hybrid automatic repeat request process to the one or more transmitted packets and controlling the retransmissions of any of the one or more transmitted packets indicated as being lost after the automatic repeat request or hybrid automatic repeat request process has been applied.

Example 59. The apparatus of any one of examples 47 to 58, wherein the repair and corresponding source data stream are carried via a radio bearer that is configured to tolerate no losses.

Example 60. The apparatus of any one of examples 47 to 59, wherein the means are further configured to perform: applying by the network node the one or more forward error correction schemes to the source stream to create the repair stream corresponding to the source stream.

Example 61. An apparatus, comprising means for performing:
by a user equipment in a wireless network, for a source stream of data where one or more forward error correction schemes have been used to create a repair stream corresponding to the source stream, receiving by the user equipment one or more packets comprising data of the source stream or the corresponding repair stream;
determining, by the user equipment, one or more losses corresponding to the one or more received packets for the received source stream and the corresponding repair stream;
determining by the user equipment whether the forward error correction scheme is known to be able to recover from the losses; and
in response to a determination the forward error correction scheme is known to be able to recover from the losses, sending by the user equipment at least one acknowledgement for any lost packets that correspond to the one or more losses.

Example 62. The apparatus of example 61, wherein sending further comprises:
determining that a packet data convergence protocol data unit containing a source packet is always followed by m packet data convergence protocol protocol data units containing repair packets corresponding to that source packet, and that a same pattern follows at radio link control, and perform:
based on only one amongst a plurality of m+1 consecutive packet data convergence protocol data units needing to be correctly received, altering and sending packet data convergence protocol status reports accordingly; and
based on only one amongst a plurality of m+1 consecutive radio link control protocol data units needing to be correctly received, sending a radio link control acknowledgement accordingly.

Example 63. The apparatus of example 62, wherein the means are further configured to perform: the user equipment determining a configuration of m via reception of RRC signaling, comprising one of the following:
as part of SDAP-Config for a configuration per quality of service flow;
as part of RadioBearerConfig for a configuration per Radio Bearer; or
as part of radio link control-BearerConfig for a configuration per radio link control bearer.

Example 64. The apparatus of example 61, wherein:
headers for the one or more received packets contain information identifying a corresponding forward error correction scheme applied;
determining by the user equipment whether the forward error correction scheme is known to be able to recover from the losses further comprises combining identification of the forward error correction scheme with a rule about the forward error correction scheme in order to determine whether one or more acknowledgements for lost packets can be sent accordingly.

Example 65. The apparatus of example 64, wherein the headers comprise headers for one or more of service data adaptation protocol, packet data convergence protocol, or radio link control headers.

Example 66. The apparatus of example 64 or 65 wherein the information identifying the forward error correction scheme identifies information from source streams with a first indication and identifies information from repair streams with a second indication.

Example 67. The apparatus of example 61, wherein determining by the user equipment whether the forward error correction scheme is known to be able to recover from the losses further comprises:
in response to the forward error correction block code boundaries being not known but instead only the forward error correction block code properties where n source blocks are encoded into m repair blocks, then up to m-n erroneous blocks can be allowed in any sliding window of m blocks.

Example 68. The apparatus of example 67, wherein determining by the user equipment whether the forward error correction scheme is known to be able to recover from the losses further comprises: in response to a new block being received in error, retransmission is requested in response to there being more than m−n−1 blocks in error among m−1 blocks received before a current block.

Example 69. The apparatus of any one of examples 61 to 68, wherein sending by the user equipment at least one acknowledgement for any lost packets that correspond to the one or more losses comprises sending by the user equipment a number of acknowledgements that is less than a number of lost packets.

Example 70. A computer program, comprising code for performing the methods of any of examples 1 to 23, when the computer program is run on a computer.

Example 71. The computer program according to example 70, wherein the computer program is a computer program product comprising a computer-readable medium bearing computer program code embodied therein for use with the computer.

Example 72. The computer program according to example 70, wherein the computer program is directly loadable into an internal memory of the computer.

Without in any way limiting the scope, interpretation, or application of the claims appearing below, a technical effect and advantage of one or more of the example embodiments disclosed herein is allowing the RAN to benefit from an FEC in upper layers by using fewer radio resources, enhancing the attractiveness of PTM for reliable delivery. As described earlier, the FEC can be at application layer, i.e., outside of radio access network (RAN). Alternatively, FEC could be implemented in RAN, for instance, in the PDCP layer. In that case, a network node, e.g., gNB, would be aware of the FEC capabilities and boundaries without any extra information.

As used in this application, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

he following abbreviations that may be found in the specification and/or the drawing figures are defined as follows:

3GPP third generation partnership project
5G fifth generation
5GC 5G core network
ADU application data unit
AM acknowledged mode
AMF access and mobility management function
ARQ automatic repeat request
CU central unit
DL downlink (from the wireless network toward the UE)
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FEC forward error correction (or forward error correcting)
gNB (or gNodeB) base station for 5G/NR, i.e., a node providing NR user plane and control plane protocol terminations towards the UE, and connected via the NG interface to the 5GC
HARQ hybrid ARQ
IETF internet engineering task force
I/F interface
LTE long term evolution
MAC medium access control
MB-UPF multicast/broadcast user plane function
MBS multicast/broadcast service
MBSU multicast/broadcast service user plane function
MME mobility management entity
NEF network exposure function
ng or NG next generation
ng-eNB or NG-eNB next generation eNB
NR new radio
N/W or NW network
PDCP packet data convergence protocol
PDU protocol data unit
PHY physical layer
PTM point to multipoint
PTP point to point
QoS quality of service
RAN radio access network
RB radio bearer
Rel release
RFC request for comments
ROHC robust header compression
RLC radio link control
RRH remote radio head
RRC radio resource control
RU radio unit
Rx receiver
SDAP service data adaptation protocol
SDU service data units
SGW serving gateway
SMF session management function
SN sequence number
TR technical report
TS technical specification
Tx transmitter
UE user equipment (e.g., a wireless, typically mobile device)
UL uplink (from the UE toward the wireless network)
UM unacknowledged mode
UPF user plane function

What is claimed is:

1. A network node in a wireless network, the network node comprising:
   at least one processor; and
   at least one memory storing instructions that, when executed by the at least one processor, cause the network node at least to perform:
   forming, by the network node, packets comprising data of a source stream and a corresponding repair stream, where the repair stream was created by using a forward error correction scheme at a packet data convergence protocol layer implemented by the network node on the source stream, the packets packaged as at least part of one or more protocol data units;
   determining, by the network node, criteria of the forward error correction scheme to know when it is necessary to retransmit any of the one or more protocol data units based on packet losses so a receiver in the user equipment is able to recover the source stream;
   applying, by the network node, an automatic repeat request or hybrid automatic repeat request process to the one or more protocol data units, wherein locations of the packets within the one or more protocol data units are tracked in the process to form tracked locations;
   transmitting, by the network node, the one or more protocol data units;
   receiving, by the network node, feedback information as part of the process corresponding to the one or more protocol data units, the feedback information comprising positive acknowledgement/negative acknowledgement response for the one or more protocol data units; and
   controlling, by the network node based on the tracked locations of the packets, the criteria, and which of the one or more protocol data units are negatively acknowledged via corresponding negative acknowledgement in the feedback information of the one or more protocol data units into which the packets were placed based on the tracked locations, retransmissions of the negatively acknowledged one or more protocol data units when the forward error correction scheme, at the packet data convergence protocol layer implemented by the user equipment, is known not to be able to compensate by recovering the source stream for losses of one or more of the packets contained in the negatively acknowledged one or more protocol data units.

2. The network node of claim 1, wherein:
   the packets, corresponding to multiple quality of services flows, are packaged as at least part of the one or more protocol data units for radio link control; and
   the controlling retransmissions comprises performing retransmission using radio link control of the negatively acknowledged one or more protocol data units in response to retransmission being indicated by a consideration of one or more forward error correction schemes used in the multiple quality of service flows.

3. The network node of claim 2, wherein the controlling retransmissions comprises, in response to a radio link control retransmission not being needed from a forward error correction viewpoint of one quality of service flow, but one or more forward error correction schemes of other quality of service flows still require that one or more negatively acknowledged protocol data units to be retransmitted, then retransmitting the one or more negatively acknowledged protocol data units.

4. The network node of claim 1, wherein:
the packets, corresponding to a single quality of services flow, are packaged as at least part of the one or more protocol data units for radio link control; and
the controlling retransmissions comprises performing radio link control retransmission of the negatively acknowledged one or more protocol data units in response to a retransmission being indicated by a consideration of a single forward error correction scheme applied to the single quality of service flow, otherwise, not performing radio link control retransmission of the negatively acknowledged one or more protocol data units.

5. The network node of claim 1, wherein:
the packets, corresponding to multiple quality of services flows, are packaged as at least part of the one or more protocol data units for medium access control; and
the controlling retransmissions comprises performing retransmission using medium access control of the negatively acknowledged one or more protocol data units in response to retransmission being indicated by a consideration of one or more forward error correction schemes used in the multiple quality of service flows.

6. The network node of claim 5, wherein the controlling retransmissions comprises, in response to a retransmission not being needed from a forward error correction viewpoint of one quality of service flow, but one or more the forward error correction schemes of other quality of service flows still require the negatively acknowledged one or more protocol data units to be retransmitted, then retransmitting the negatively acknowledged one or more protocol data units.

7. The network node of claim 1, wherein:
the packets, corresponding to a single quality of services flow, are packaged as at least part of the one or more protocol data units for medium access control; and
the controlling retransmissions comprises performing medium access control retransmission of the negatively acknowledged one or more protocol data units in response to retransmission being indicated by a consideration of a single forward error correction scheme applied to the single quality of service flow; otherwise, not performing medium access control retransmission of the negatively acknowledged one or more protocol data units.

8. The network node of claim 1, wherein:
the packets are packaged as at least part of a service data unit;
the forward error correction scheme generates m repair packets for one source packet; and
the transmitting further comprises ensuring that each one of the packets is contained within a single protocol data unit corresponding to the service data unit and that the m repair packets corresponding to a same source packet use a same sequence number as the protocol data unit carrying that source packet.

9. The network node of claim 1, wherein the source and corresponding repair stream are provided to the network node via individual quality of service flows, and the quality of service flows for one or more sets of source and corresponding repair streams are mapped to individual radio bearers.

10. The network node of claim 1, wherein the source and corresponding repair stream are provided to the network node via individual quality of service flows, and the individual quality of service flows are mapped to two individual radio bearers, and wherein the controlling retransmissions further comprises:
processing the feedback information for the acknowledgement/negative acknowledgement response for each radio bearer for the two individual radio bearers; and
determining jointly for the two individual bearers what protocol data unit needs to be retransmitted on each of the two bearers, based on the forward error correction scheme, and retransmitting accordingly.

11. The network node of claim 1, wherein the source and corresponding repair stream are provided to the network node via individual quality of service flows, and the individual quality of service flows are mapped to individual radio bearers of two radio bearers, and wherein the controlling retransmissions further comprises:
processing the feedback information for the acknowledgement/negative acknowledgement response for each radio bearer for the two radio bearers, with radio link control protocol data units from multiple bearers multiplexed into one media access control protocol data unit; and
determining jointly for the two radio bearers in media access control what packets at least partially comprised in the media access control protocol data unit cannot be recovered on each of the two radio bearers, based on the forward error correction scheme, and retransmitting the media access control protocol data unit accordingly.

12. The network node of claim 1, wherein the repair stream and corresponding source data stream are carried via a radio bearer that is configured to tolerate no losses.

13. The network node of claim 1, wherein the instructions, when executed by the at least one processor, cause the network node to perform: applying by the network node the one or more forward error correction schemes to the source stream to create the repair stream corresponding to the source stream.

14. The network node of claim 1, wherein:
the controlling retransmissions causes retransmission of only those protocol data units that are needed to correct losses according to the forward error correction scheme but not all protocol data units indicated as being negatively acknowledged are retransmitted.

15. A user equipment in a wireless network, comprising:
at least one processor; and
at least one memory including instructions that, when executed by the at least one processor, cause the user equipment to:
for a source stream of data where a forward error correction scheme has been used to create a repair stream corresponding to the source stream at a packet data convergence protocol layer, receive by the user equipment streams that when transmitted had packets comprising data of the source stream and the corresponding repair stream and placed into protocol data units, wherein the forward error correction scheme at the packet data convergence protocol layer is known to the user equipment as well as whether the packets in the streams are from the source stream or the repair stream, and the packets packaged as at least part of one or more protocol data units;
determine, by the user equipment, one or more protocol data units have been lost for the streams;
performing one of the following:
determining by the user equipment the forward error correction scheme at the packet data convergence protocol layer is known to be able to recover the source stream from one or more protocol data units that have not been lost, and sending by the user equipment at least one positive acknowledgement for the one or more lost protocol data units even though these one or more protocol data units have been lost; or determining by the user equipment the forward error correction scheme at the packet data convergence protocol layer is known not to be able to recover the source stream from one or more protocol data units that have not been lost, and sending by the user equipment at least one negative acknowledgement for the one or more lost protocol data units.

16. The user equipment of claim 15, wherein a protocol stack used by the user equipment for transmission and reception comprises a packet data convergence protocol layer and a radio link control layer, wherein protocol data units for the packet data convergence protocol layer are input to or received from the radio link control layer, and protocol data units for the radio link control layer are input to or received from a medium access control layer, wherein sending further comprises:

determining, in the packet data convergence protocol layer, that a received protocol data unit containing a source packet is always followed by m received protocol data units containing repair packets corresponding to that source packet, and that a same pattern follows at the radio link control layer, and perform:

based on only one amongst a plurality of m+1 consecutive protocol data units in the packet data convergence protocol layer needing to be correctly received, altering and sending packet data convergence protocol status reports accordingly; and based on only one amongst a plurality of m+1 consecutive protocol data units in the radio link control layer needing to be correctly received, sending a radio link control acknowledgement accordingly.

17. The user equipment of claim 16, wherein the instructions, when executed by the at least one processor, cause the user equipment to perform: the user equipment determining a value to be used for m via reception of radio resource control signaling, comprising one of the following:

as part of SDAP-FIG. for a configuration per quality of service flow;

as part of RadioBearerConfig for a configuration per Radio Bearer; or as part of radio link control-BearerConfig for a configuration per radio link control bearer.

18. The user equipment of claim 15, wherein:

headers for received packets contain information identifying a corresponding forward error correction scheme applied; and determining by the user equipment the forward error correction scheme is known to be able to recover from the one or more protocol data units that have not been lost further comprises combining identification of the forward error correction scheme with a rule about the forward error correction scheme in order to determine that one or more acknowledgements for lost protocol data units can be sent accordingly.

19. The user equipment of claim 15, wherein determining by the user equipment the forward error correction scheme is known to be able to recover the source stream from the one or more protocol data units that have not been lost further comprises:

in response to forward error correction block code boundaries being not known but instead only forward error correction block code properties being known, where n source blocks are encoded into m repair blocks such that there are n source blocks and (m-n) repair blocks, then up to m-n erroneous blocks can be allowed in any sliding window of m blocks for the forward error correction scheme to be known to be able to recover from the one or more protocol data units that have not been lost.

20. The user equipment of claim 15, wherein sending by the user equipment at least one positive acknowledgement for the one or more lost protocol data units comprises sending by the user equipment a number of acknowledgements that is less than a number of the one or more protocol data units.

* * * * *